US011387012B2

(12) United States Patent
Cheng et al.

(10) Patent No.: US 11,387,012 B2
(45) Date of Patent: Jul. 12, 2022

(54) STANDING NANOWIRE-BASED ELASTIC CONDUCTOR

(71) Applicant: MONASH UNIVERSITY, Clayton (AU)

(72) Inventors: Wenlong Cheng, Clayton (AU); George P Simon, Clayton (AU); Yan Wang, Clayton (AU)

(73) Assignee: MONASH UNIVERSITY, Clayton (AU)

( * ) Notice: Subject to any disclaimer, the term of this patent is extended or adjusted under 35 U.S.C. 154(b) by 22 days.

(21) Appl. No.: 16/610,067

(22) PCT Filed: Apr. 24, 2018

(86) PCT No.: PCT/AU2018/000058
§ 371 (c)(1),
(2) Date: Oct. 31, 2019

(87) PCT Pub. No.: WO2018/201181
PCT Pub. Date: Nov. 8, 2018

(65) Prior Publication Data
US 2020/0152346 A1    May 14, 2020

(30) Foreign Application Priority Data

May 1, 2017    (AU) ............................... 2017901574
May 8, 2017    (AU) ............................... 2017901688

(51) Int. Cl.
*H01B 1/02* (2006.01)
*H01B 13/00* (2006.01)
*B22F 9/24* (2006.01)
*B22F 1/07* (2022.01)
*B82Y 30/00* (2011.01)
*B82Y 40/00* (2011.01)

(52) U.S. Cl.
CPC ................. *H01B 1/02* (2013.01); *B22F 1/07* (2022.01); *B22F 9/24* (2013.01); *H01B 13/0036* (2013.01); *B82Y 30/00* (2013.01); *B82Y 40/00* (2013.01)

(58) Field of Classification Search
CPC .......... H01B 1/02; B82Y 30/00; B82Y 15/00; B82Y 10/00; B22F 9/24; B22F 1/07
USPC .......... 252/500, 510, 511; 427/125; 438/686
See application file for complete search history.

(56) References Cited

U.S. PATENT DOCUMENTS

2007/0200477 A1*  8/2007  Tuominen .............. B82Y 10/00
                                                        313/309
2014/0234157 A1   8/2014  Chen et al.
2016/0077090 A1*  3/2016  Biris ................ G01N 33/54346
                                                        435/5

FOREIGN PATENT DOCUMENTS

EP      2871678 A1    5/2015
WO   2014165908 A1   10/2014

OTHER PUBLICATIONS

Plass "Flexible Polymer-Embedded Si Wire Arrays." Adv. Mater. 2009, 21, 325-328 (Year: 2009).*
Yu "Design and fabrication of silicon nanowires towards efficient solar cells." Nano Today 11 (2016) 704-737 (Year: 2016).*

(Continued)

*Primary Examiner* — Tri V Nguyen
(74) *Attorney, Agent, or Firm* — McCoy Russell LLP

(57) ABSTRACT

An elastic conductor comprising: an elastomeric substrate, and an array of nanowires, wherein the nanowires are upstanding relative to the surface of the substrate.

12 Claims, 27 Drawing Sheets

(56) References Cited

OTHER PUBLICATIONS

Volger, J., "Note on the Hall Potential Across an Inhomogeneous Conductor," vol. 79, No. 6, Mar. 27, 1950, 2 pages.
Griffiths, D., "Introduction to Electrodynamics," Cambridge, United Kingdom, Cambridge University Press, Available as Early as Jan. 1981, 596 pages.
Abdelsalam, M. et al., "Wetting of Regularly Structured Gold Surfaces," Langmuir, vol. 21, No. 5, Jan. 21, 2005, 5 pages.
McAlpine, M. et al., "Highly ordered nanowire arrays on plastic substrates for ultrasensitive flexible chemical sensors," Nature Materials, vol. 6, No. 5, May 2007, Available Online Apr. 22, 2007, 14 pages.
Sekitani, T. et al., "Stretchable active-matrix organic light-emitting diode display using printable elastic conductors," Nature Materials, vol. 8, No. 6, Jun. 2008, 6 pages.
Chun, K. et al., "Highly conductive, printable and stretchable composite films of carbon nanotubes and silver," Nano Nanotechnology, vol. 5, No. 12, Dec. 2010, Available Online Nov. 28, 2010, 5 pages.
Yamada, T. et al., "A stretchable carbon nanotubes strain sensor for human-motion detection," Nature Nanotechnology, vol. 6, No. 5, May 2011, Available Online Mar. 27, 2011, 6 pages.
Thongrattanasiri, S. et al., "Total light absorption in graphene," arXiv Cornell University Website, Available Online at https://arxiv.org/abs/1106.4460, Available as Early as Jun. 22, 2011, 5 pages.
Lipomi, D. et al., "Skin-like pressure and strain sensors based on transparent elastic films of carbon nanotubes," vol. 6, No. 12, Oct. 23, 2011, 5 pages.
Lee. P. et al., "Highly Stretchable and Highly Conductive Metal Electrode by Very Long Metal Nanowire Percolation Network," Advanced Materials, vol. 24, No. 25, Jul. 3, 2012, Available Online May 21, 2012, 7 pages.
Xu, F. et al., "Highly Conductive and Stretchable Silver Nanowire Conductors," Advanced Materials, vol. 24, No. 37, Sep. 25, 2012, Available Online Jul. 12, 2012, 9 pages.
Park, M. et al., "Highly stretchable electric circuits from a composite material of silver nanoparticles and elastomeric fibres," Nature Nanotechnology, vol. 7, No. 12, Dec. 2012, Available Online Nov. 25, 2012, 7 pages.
Zhu, S. et al., "Ultrastretchable Fibers with Metallic Conductivity Using a Liquid Metal Alloy Core," Advanced Functional Materials, vol. 23, No. 18, May 13, 2013, Available Online Dec. 13, 2012, 7 pages.
He, J. et al., "Forest of Gold Nanowires: A New Type of Nanocrystal Growth," ACS Nano, vol. 7, No. 3, Feb. 26, 2013, 8 pages.
Moon, G. et al., "Highly Stretchable Patterned Gold Electrodes Made of Au Nanosheets," Advanced Materials, vol. 25, No. 19, May 21, 2013, Available Online Apr. 9, 2013, 6 pages.
Kaltenbrunner, M. et al., "An ultra-lightweight design for imperceptible plastic electronics," Nature, vol. 499, No. 7459, Jul. 25, 2013, 8 pages.
Keplinger, C. et al., "Stretchable, Transparent, Ionic Conductors," Science, vol. 341, No. 6149, Aug. 30, 2013, 16 pages.
Ho, X. et al., "Biaxially stretchable transparent conductors that use nanowire networks," vol. 29, No. 24, Dec. 28, 2014, 1 page.
Cheng, Y. et al., "Copper Nanowire Based Transparent Conductive Films with High Stability and Superior Stretchability," Journal of Materials Chemistry C, No. 27, Apr. 10, 2014, 22 pages.
Gong, M. et al., "Nanoscale nickel oxide/nickel heterostructures for active hydrogen evolution electrocatalysis," Nature Communications, vol. 5, No. 4695, Aug. 22, 2014, 6 pages.
Lee, M. et al., "Studies on the mechanical stretchability of transparent conductive film based on graphene-metal nanowire structures," Nanoscale Research Letters, vol. 10, No. 27, Jan. 31, 2015, 9 pages.
Joshipura, I. et al., "Methods to pattern liquid metals," Journal of Materials Chemistry C, vol. 3, No. 16, Mar. 31, 2015, 9 pages.
Gong, S. et al., "Highly Stretchy Black Gold E-Skin Nanopatches as Highly Sensitive Wearable Biomedical Sensors," Advanced Electronic Materials, vol. 1, No. 4, Apr. 2015, 7 pages.
Matsuhisa, N. et al., "Printable elastic conductors with a high conductivity for electronic textile applications," Nature Communications, vol. 6, No. 7461, Jun. 25, 2015, 11 pages.
Jason, N. et al., "Copper Nanowires as Conductive Ink for Low-Cost Draw-On Electronics," ACS Applied Materials & Interfaces, vol. 7, No. 30, Aug. 5, 2015, Available Online Jul. 10, 2015, 7 pages.
Hong, S. et al., "Highly Stretchable and Transparent Metal Nanowire Heater for Wearable Electronics Applications," Advanced Materials, vol. 27, No. 32, Aug. 26, 2015, Available Online Jul. 14, 2015, 8 pages.
Jang, H. et al., "Ultra-mechanically stable and transparent conductive electrodes using transferred grid of Ag nanowires on flexible substrate," Current Applied Physics, vol. 16, No. Jan. 2016, 7 pages.
Tybrandt, K. et al., "Fast and Efficient Fabrication of Intrinsically Stretchable Multilayer Circuit Boards by Wax Pattern Assisted Filtration," Small, vol. 12, No. 2, Jan. 13, 2016, Available Online Nov. 30, 2015, 5 pages.
Ma, Z. et al., "Liquid-Wetting-Solid Strategy To Fabricate Stretchable Sensors for Human-Motion Detection," ACS Sensors, vol. 1, No. 3, Jan. 19, 2016, 9 pages.
Chou N. et al., "A Method to Pattern Silver Nanowires Directly on Wafer-Scale PDMS Substrate and Its Applications," ACS Applied Materials & Interfaces, vol. 8. No 9, Feb. 16, 2016, 5 pages.
Jia, Y. et al., "Silver Nanowire Transparent Conductive Films with High Uniformity Fabricated via a Dynamic Heating Method," ACE Applied Materials & Interfaces, vol. 8, No. 15, Apr. 20, 2016, Available Online Apr. 7, 2016, 7 pages.
Yu, X. et al., "Materials, Mechanics, and Patterning Techniques for Elastomer-Based Stretchable Conductors," Micromachines, vol. 8, No. 1, Jan. 2017, Available Online Dec. 27, 2016, 29 pages.
Gong, S. et al., "One-Dimensional Nanomaterials for Soft Electronics," Advanced Electronics Materials, vol. 3, No. 3, Mar. 2017, Available Online Dec. 30, 2016, 29 pages.
Li, Z. et al., "Recent Advances in Pen-Based Writing Electronics and their Emerging Applications," Advanced Functional Materials, vol. 18, No. 2, Feb. 22, 2018, 16 pages.
ISA Australian Patent Office, International Search Report Issued in Application No. PCT/AU2018/000058, dated Jul. 5, 2018, WIPO, 3 pages.

* cited by examiner

ε = 0%    ε = 300%    ε = 0%
FIG 1A
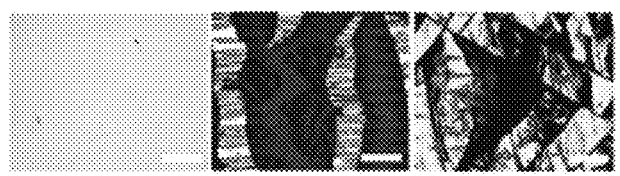
FIG 1B
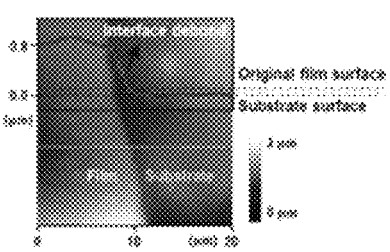
FIG 1C
FIG 1D
FIG 1E
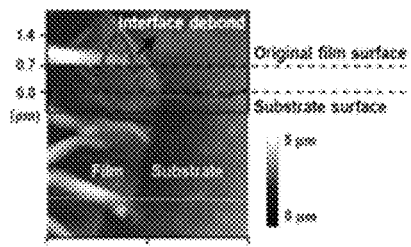
FIG 1F
FIG 1G
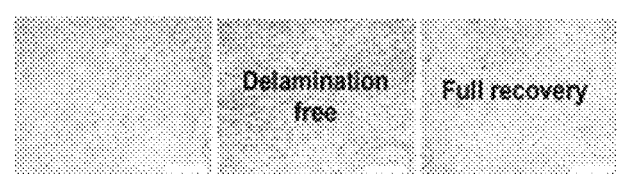
FIG 1H
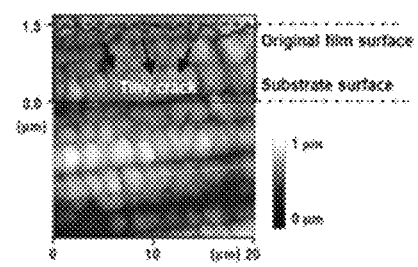
FIG 1I

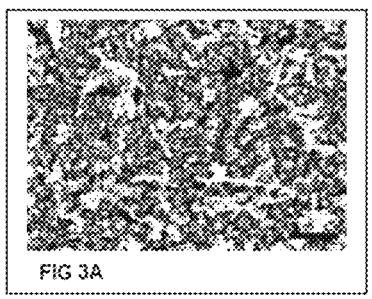
FIG 3A
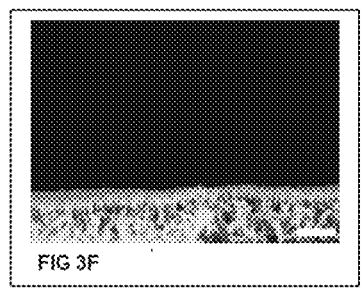
FIG 3F
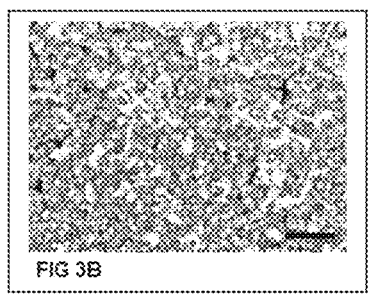
FIG 3B
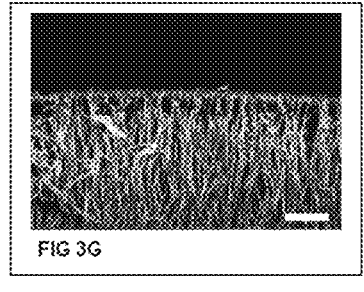
FIG 3G
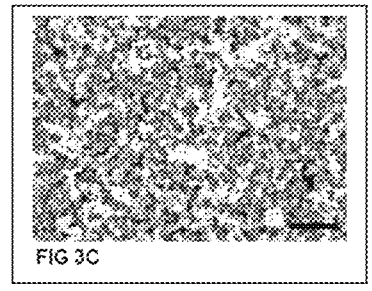
FIG 3C
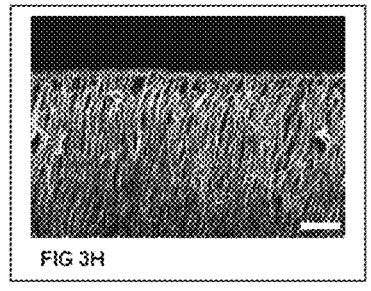
FIG 3H
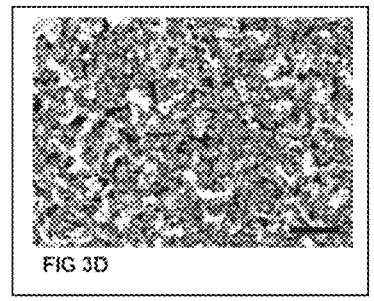
FIG 3D
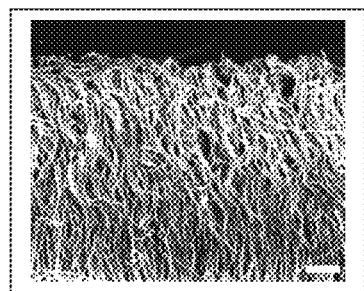
FIG 3I
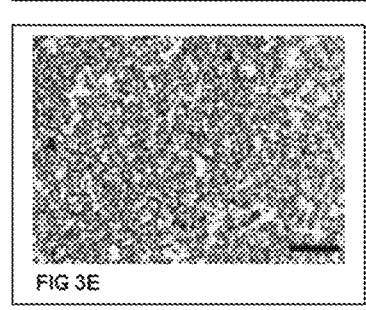
FIG 3E
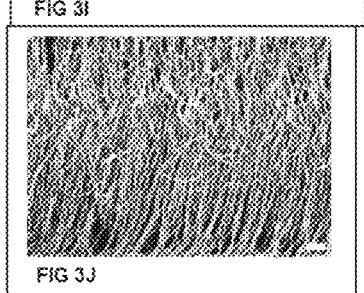
FIG 3J
FIG. 3

FIG. 6C
FIG. 6D
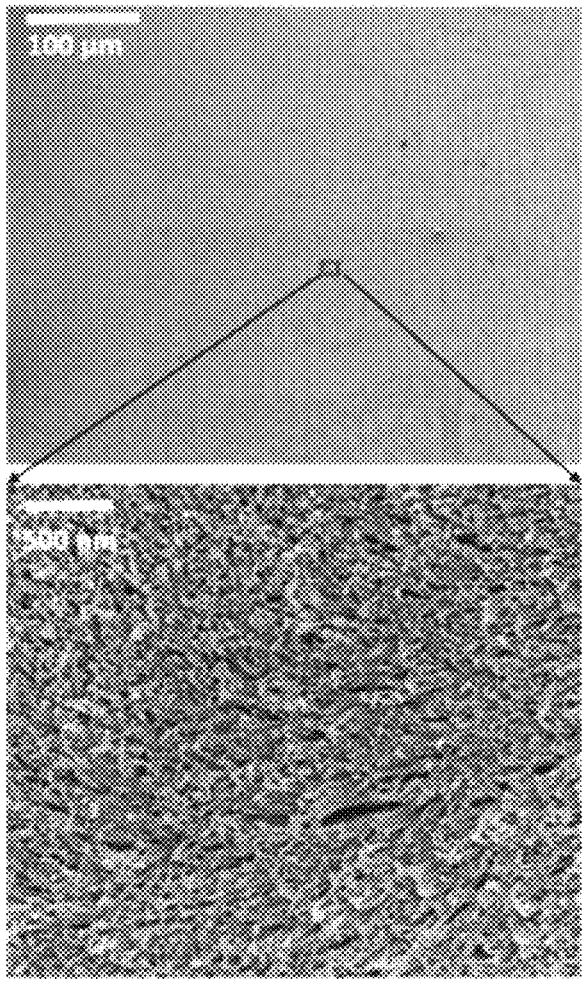
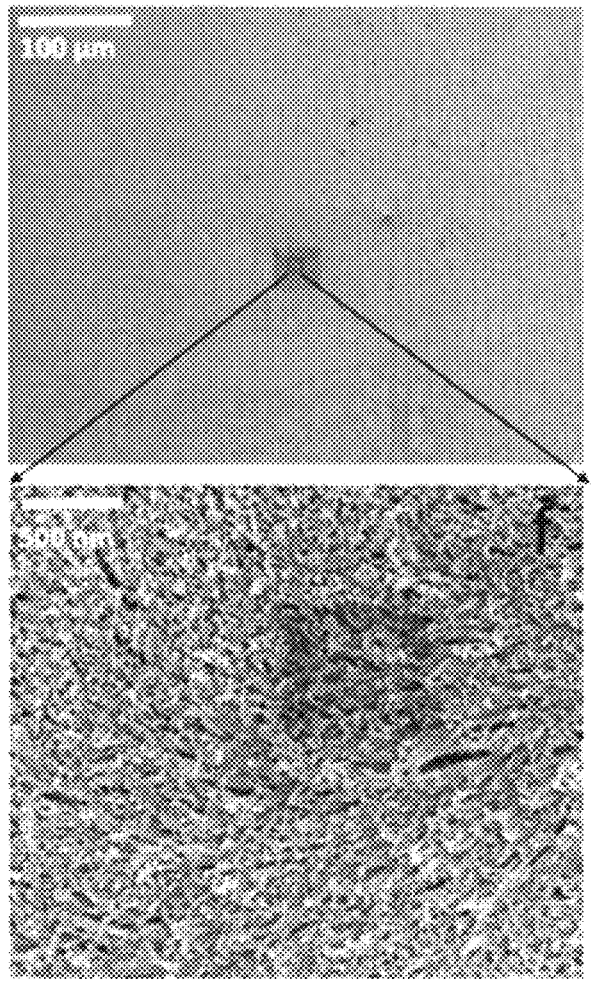
FIG. 6E
FIG. 6F

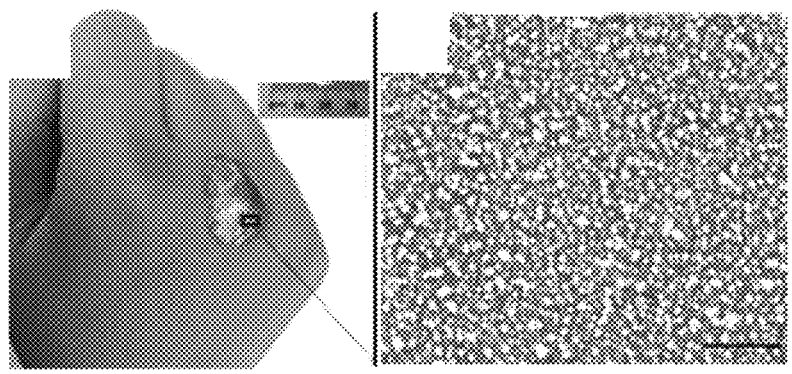
FIG 13A   FIG 13B
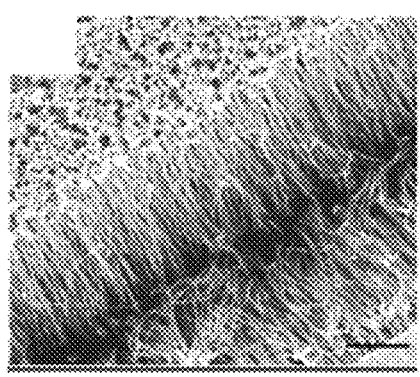
FIG 13C
FIG 13D
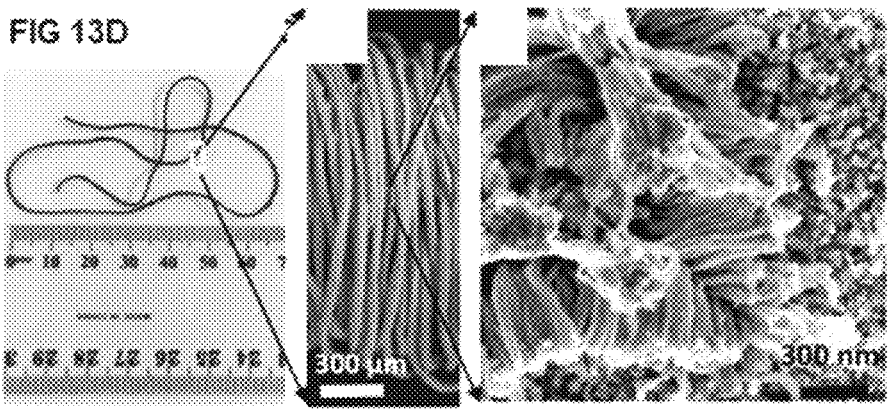
FIG 13E   FIG 13F
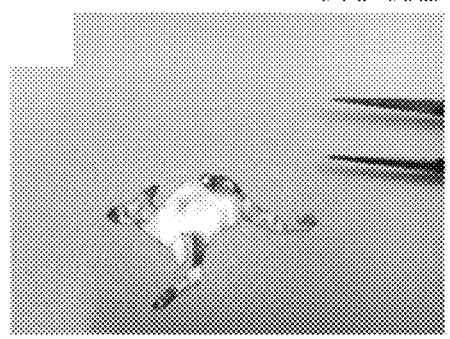 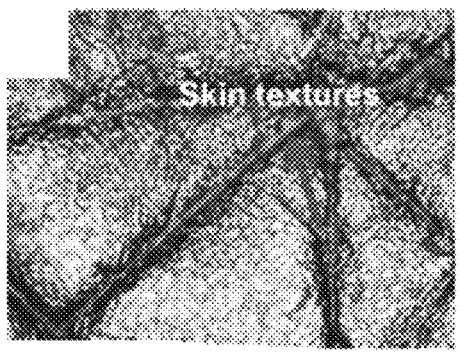
FIG 13G   FIG 13H

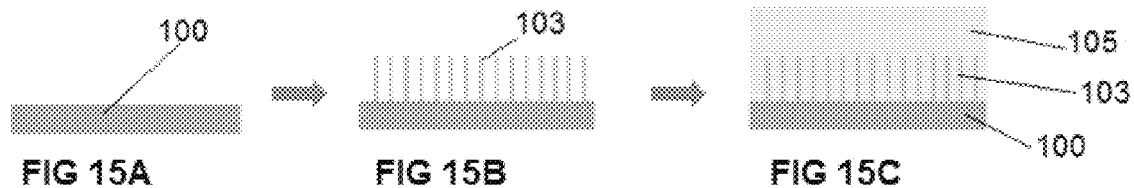
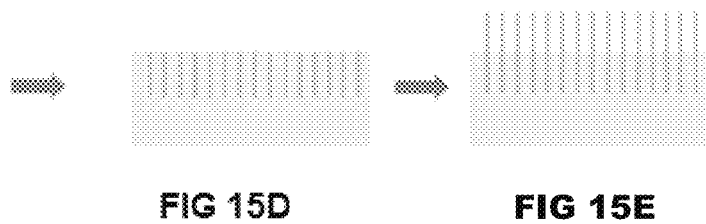
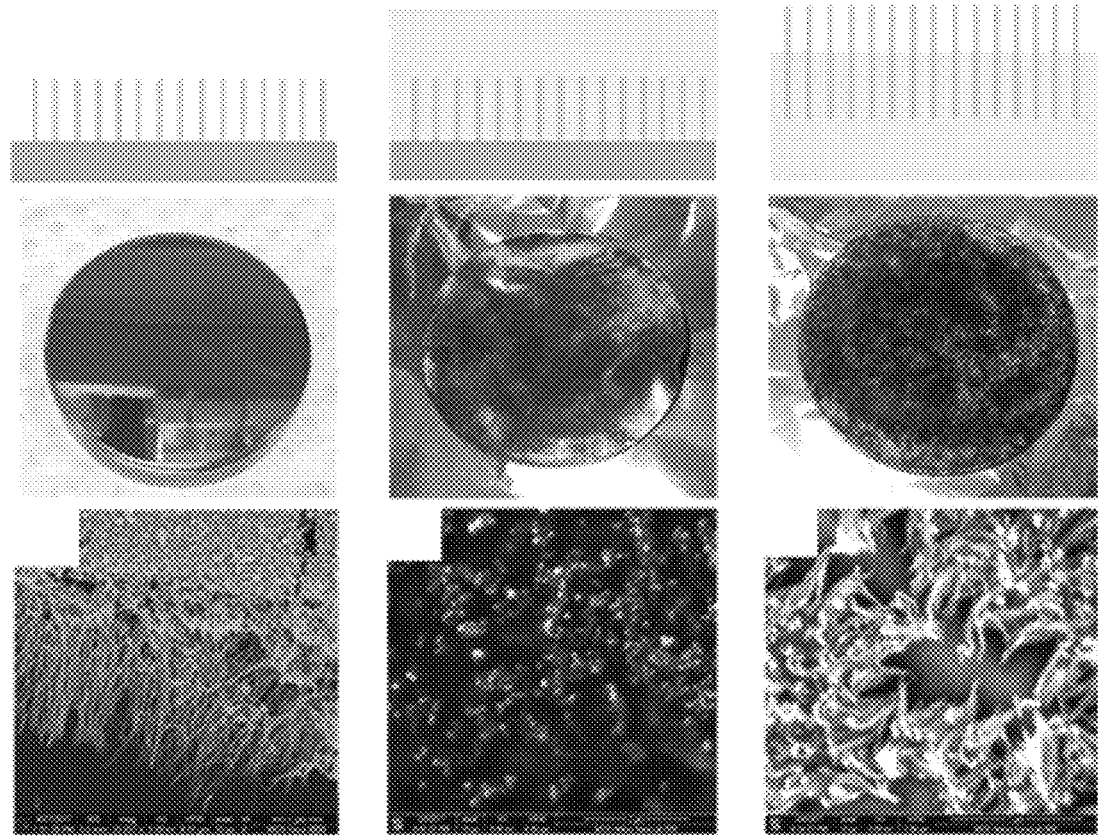

STANDING NANOWIRE-BASED ELASTIC CONDUCTOR

CROSS-REFERENCE TO RELATED APPLICATIONS

The present application is a U.S. National Phase of International Patent Application Ser. No. PCT/AU2018/000058 entitled "STANDING NANOWIRE-BASED ELASTIC CONDUCTORS," filed on Apr. 24, 2018. International Patent Application Ser. No. PCT/AU2018/000058 claims priority to Australian Patent Application No. 2017901574 filed on May 1, 2017 and Australian Patent Application No. 2017901688 filed on May 8, 2017. The entire contents of each of the above-referenced applications are hereby incorporated by reference for all purposes.

FIELD OF INVENTION

The present invention relates to the field of elastic conductors and fabrication thereof.

In one form, the invention relates to deformable films suitable for use as sensors.

In one particular aspect the present invention is suitable for use in a broad range of technologies and applications ranging from electronic skins on robots to wearable health monitors.

It will be convenient to hereinafter describe the invention in relation to measurement of human biological parameters however it should be appreciated that the present invention is not limited to that use only and can be applied to a wide range of medical (including veterinary) and non-medical uses, including industrial uses.

BACKGROUND ART

It is to be appreciated that any discussion of documents, devices, acts or knowledge in this specification is included to explain the context of the present invention. Further, the discussion throughout this specification comes about due to the realisation of the inventor and/or the identification of certain related art problems by the inventor. Moreover, any discussion of material such as documents, devices, acts or knowledge in this specification is included to explain the context of the invention in terms of the inventor's knowledge and experience and, accordingly, any such discussion should not be taken as an admission that any of the material forms part of the prior art base or the common general knowledge in the relevant art in Australia, or elsewhere, on or before the priority date of the disclosure and claims herein.

Soft electronics require a seamless combination of stretchability and conductivity, which can be achieved extrinsically (e.g. by bulking design of continuous metal films) or intrinsically (e.g. by using nanomaterials). The former is achieved by designing structures that stretch and the latter is realized by designing novel materials that stretch. Either strategy involves the design of soft/hard materials interface, which tends to fail leading to delamination and/or cracks due to mechanical mismatch. The Young's moduli of active materials including metals, semiconductors, carbons, and conducting polymers, are typically a few orders of magnitude higher than those of elastomeric polymers or skins.

The aforementioned issues may be circumvented by using liquid-based active materials, such as gallium-indium alloys or ionic liquids. However, liquid-based systems typically require encapsulation in a channel, preventing them from being used in second-skin-like thin wearable and implantable devices. In addition, high surface tension and poor conductivity are also among the limitations. Creating the next generation of electronic devices will require the introduction of new features including intrinsic stretchability, self-healing, bio-degradability, invisibility, ultrathin and facile large scale processing techniques.

Conductive materials with intrinsic stretchability are ideal potential candidates for stretchable electronics in multiple applications such as soft robotics, biomedical/implantable devices, stretchable light-emitting displays and other curvilinear systems require materials with high and reversible conductivity over a wide range of tensile strain. For example, electronic skins (e-skins) are a new class of advanced materials that mimics some of the properties of human skin in one or more ways, such as its sensitivity to pressure and temperature. E-skin must be thin, stretchable and sufficiently robust that it can be pressed, bent, twisted and stretched while maintaining outstanding optoelectronic responses, and will be key components in future wearable electronics. E-skin is developing rapidly in its applications in human-like robotics, healthcare, wearable electronics, and biomedical monitoring. Many of the prior art e-skins are created by laminating materials together to craft ultra-stretchy electronics with the desired properties.

Such materials and devices have, in principle, the advantage of not requiring complex structural engineering or photolithography. The best-known example of intrinsically stretchable conductors is liquid metal (e.g. gallium-indium alloy) encapsulated in soft materials (Joshipura et al, Journal of Materials Chemistry C 3, 3834-3841 (2015); Zhu et al, Advanced Functional Materials 23, 2308-2314 (2013); Mohammed & Kramer, Advanced Functional Materials 23, 2308-2314 (2013)). However, the high surface tension and the passivating oxide skin that spontaneously forms on the surface of these liquids hinder their applications with conventional techniques. In addition, ionic conductors have also been used for intrinsically stretchable conductive components but suffered from poor conductivity (Keplinger et al, Science 341, 984-987 (2013); Ma et al, ACS Sensors 1, 303-311 (2016)).

In another example, WO 2014/165908 (Cheng et al) describes a device for use in sensing physical force comprising a first support layer, a flexible layer coated with an ultrathin conductive layer (such as nanoparticles, nanowires or nanorods), a current collector and a second support layer. However, the device can only perform pressure sensing, as application of pressure is required to bring the ultrathin layer into contact with electrodes.

Existing elastic conductors can be achieved extrinsically (e.g. by bulking design of continuous metal films) or intrinsically (e.g. by using nanomaterials). Either strategy suffers the drawbacks of delamination and/or cracks at the soft/hard materials interface when subjected to high and/or repetitive strains, which limits the long-term durability of current systems.

Efforts have been made to improve stretchability and conductivity by implementation of nanometer-scale percolated networks, for example, nanowires (Xu & Zhu, Advanced materials 24, 5117-5122 (2012); Gong et al, Advanced Electronic Materials 1, (2015); and Gong et al, Nature communications 5, (2014)) or carbon nanotubes (Sekitani et al, Nature materials 8, 494-499 (2009); Lipomi et al, Nature nanotechnology 6, 788-792 (2011); Yamada et al, Nature nanotechnology 6, 296-301 (2011)) that are on or embedded in an elastomeric matrix. Despite encouraging progress, these thin films or composites often experience material delamination or cracking under large strain (Lee et al, Advanced materials 24, 3326-3332 (2012)), which lead to huge permeant conductivity losses. High stretchability will require extrinsic structural design to combine bulking or pre-straining techniques.

Furthermore, the fabrication methods of the prior art are generally complex and time consuming. They include dip coating, direct writing (Jason et al, ACS App. Mats & Interfaces 7, 16760-16766 (2015); Li Z, et al. Adv. Functional Mats 26, 165-180 (2016)), Meyer rod coating (Jia et al, ACS App. Mats & Interfaces 8, 9865-9871 (2016)), transferring (Hong et al. Adv. Mats 27, 4744-4751(2015), Jang et al, Current App. Phys 16, 24-30 (2016)), and spin coating (McAlpine et al, Nat. Mats 6, 379-384 (2007)).

Consequently, high performance elastic conductors that circumvent the abovementioned limitations are in demand.

SUMMARY OF INVENTION

An object of the present invention is to provide an improved electronic conductor.

Another object of the present invention is to provide an economical method of fabricating elastic conductors.

A further object of the present invention is to alleviate at least one disadvantage associated with the related art.

It is an object of the embodiments described herein to overcome or alleviate at least one of the above noted drawbacks of related art systems or to at least provide a useful alternative to related art systems.

In a first aspect of embodiments described herein there is provided an elastic conductor comprising:
an elastomeric substrate, and
an array of nanowires,
wherein the nanowires are standing relative to the surface of the substrate.

The structure of nanowires often varies according to the method of synthesis. For example, if a ligand shell is used in the synthesis, the structure may have a nanoparticle head comprising a nanoparticle "head" group that is typically polar, and a nanowire tail that is hydrophobic. This is true for example, when Au(I) is complexed by oleylamine. Oleylamine molecules form inverse micellar structure by self assembling polar (—$NH_2$) groups attracting each other and forming a kind of core while hydrophobic chains form in a perpendicular direction.

The array may alternatively comprise other head/tail nanowire configurations, multiple layers (eg bilayers or multilayered nanoarchitectures) and conformations such as staircase-like nanowire arrays. For example, the array may be a bilayer, the two layers oriented head-to-head, head-to-tail or tail-to-tail.

Each array may have at least two regions that exhibit different physical or chemical properties. In a preferred embodiment of the present invention, the majority of nanowires of the array have tails adjacent the surface of the substrate (first region) and 'free' heads forming the surface of the elastic conductor (second region). In another, less preferable embodiment of the present invention, the majority of nanowires of the array are oriented with their heads adjacent the surface of the substrate.

The conductor of the present invention exhibits characteristics such as high intrinsic stretchability without the need for extrinsic structural design. Furthermore, typically, the first region and the second region have different characteristics with respect to electricity conduction, light interaction and water interaction.

Typically, the nanowires comprise a noble metal, such as gold.

The elastomeric substrate is typically a silicone-based or carbon-based polymer. The specific choice of elastomeric substrate will mainly depend on the application.

Preferably, the elastomeric substrate is chosen from the group comprising polyethylene terephthalate (PET), polydimethylsiloxane (PDMS), silicones, and polyurethanes in the form of film or filament or other convenient configuration.

For example, when the elastic conductor is intended for use as an e-skin, or sensor adjacent skin, the preferred elastomeric substrate may be a silicone elastomer, which is a mouldable skin-texture film with a thickness of 20-30 μm. For example, silicones such as those sold under the trade mark Sylgard®, or platinum-catalysed silicones sold under the trade mark Ecoflex®, are particularly preferred but other silicones will be known to the person skilled in the art. Preferred characteristics for the elastomeric substrate used in the present invention include the ability to cure at room temperature with negligible shrinkage and low viscosity. After curing, the elastomer exhibits the characteristics of softness, strength and a non-tacky surface. It can be stretched to many times its original area without tearing, and then rebounds to its original form without distortion.

Without wishing to be bound by theory, deformation of the elastomer is transferred to a change in electrical conductivity as the standing nanowires are bunched together or separated as a result of the deformation. This is key functionality of sensors comprising the nanowires and enables them to provide highly sensitive measures of deformation of the elastomeric substrate to which they are affixed.

The use of standing nanowires distinguishes the present invention from the nanomaterial-based elastic conductors of the prior art which comprise nanowires that lie on the surface of elastomeric substrates. In particular, preferably the first region comprises the free end ("head") of the upstanding metal nanowires and behaves like bulk metal. Conversely, the second region comprises the "tail" affixed to the substrate and behaves like a discontinuous nanophase. Thus, the first region is hydrophilic but the second region is hydrophobic; the first region reflects light like bulk gold, yet the second region is a broadband super absorber; the first region is less conductive but with tunable resistance.

Although standing nanowires are known in relation to the manufacture of rigid electronic devices they have not previously been used for elastic conductors. For example US 20140234157 (Chen et al) teaches a method for attaching noble metal nanoparticles to a rigid substrate and 'growing' nanowires by contacting the nanoparticle with an aqueous solution comprising a ligand (organic compound having a thiol group) noble metal ions and a reducing agent.

By contrast, the elastic conductor of the present invention exhibits unusual mechatronic properties when being stretched, bent and pressed. Elastic conductors according to the present invention having tail-bonded nanowires have been shown to be capable of being stretched up to ~800% without losing conductivity. This is about 10 times more that equivalent conductors having head-bonded nanowires. In addition, the latter is more sensitive to bending forces and point loads than corresponding tail-bonded nanowire elastic conductors.

Thus, in another aspect of embodiments described herein there is provided a method of fabricating the elastic conductor the present invention, the method comprising the steps of:
functionalising a surface of an elastomeric substrate, seeding the functionalised surface with particulate noble metal, and growing standing nanowires from the particulate noble metal.

In a particularly preferred embodiment the noble metal is gold.

Functionalising is the act of introducing chemical functional groups to the surface of the elastomeric substrate and imparts physical, chemical or biological characteristics that are different to those originally found. In a preferred embodiment, the step of functionalising the surface of the elastomeric substrate includes plasma pre-treatment. For example, $O_2$ plasma pre-treatment may improve the hydrophilicity of the surface in anticipation of attaching a functional moiety such as amino groups. A silanization step typically follows. By covalently binding functional moieties through stable silicon carbon bonds, the surface characteristics of the elastomer can be tailored at will by varying the organic groups.

The functionalised substrate can then be seeded by metal seeds adsorbed onto the surface. The seeds are typically a few nanometres in size (eg between 2 and 10 nm). The film can then be floated onto the surface of a growth solution comprising the noble metal precursors, surfactants and reducing agents with the functionalised side facing the solution to promote uniform growth of standing nanowires without the formation of any precipitates.

The length of the nanowires is controlled by the length of time the film is in contact with the solution ('growth time'). Longer growth times lead to longer nanowires but a maximum length tends to be reached in about 20 minutes. Using this fabrication method it is possible to obtain nanowires having a tunable length of up to about 14 micron, which is long compared with teaching in the prior art (Wang et al, ACS Nano &: 2733-2740 (2013)). The nanowires stand normal to the surface of the elastomer with a typical density of about $1.09 \times 10^4$ micron/$m^2$ and diameter of about 7.8 +/−1.7 nm.

In a preferred embodiment the elastic conductor of the present invention includes a further elastomeric layer that essentially encapsulates at least part of the standing nanowires. This provides a particularly robust elastic conductor that resists debonding and delamination when subjected to interface friction and other physical stress. When the nanowires are grown on silicon, they can be lifted off forming free-standing films, enabling the construction of versatile head/tail nanowire configurations and multilayered nano-architectures. It is even possible to grow staircase-like nanowire films by mask-assisted step growth.

Accordingly, there is provided a method of fabricating the elastic conductor the present invention, the method comprising the steps of:

functionalising a surface of a base substrate, seeding the functionalised surface with particulate noble metal, growing standing nanowires from the particulate noble metal, applying an elastomeric substrate to the base substrate such that the standing nanowires are at least partially embedded in the elastomeric substrate, separating the base substrate and elastomeric substrate, and further growing the nanowires embedded in the elastomeric substrate.

The base substrate is typically a rigid substrate such as a silicon wafer which can readily be functionalised in preparation for nanowire growth. It is also important that the base substrate can be readily separated from the elastomeric substrate.

Without wishing to be bound by theory it is believed that the mechanical sensing is enabled by the effective contact between the neighbouring high-aspect-ratio nanowires. A tiny displacement in the array of nanowires can be interpreted into a change of electrical resistance in response to external stimuli.

The hierarchical nanowire structure also allows for ultrafast response with minimal hysteresis, which shows to be advantageous to their metal nanowire counterparts of the prior art that use planar geometry such as those described in Ho et al, J. Mat.s Res. 29, 2965-2972 (2014); Cheng et al, J. Mats Chem. C 2, 5309 (2014); Chou et al, ACS App. Mats & Interfaces 8, 6269-6276 (2016); and Lee et al, Nanoscale Res. Lett. 10, 27 (2015).

It is noted that conventional metallic thin films of the prior art, whether in continuous bulk phase or in discontinuous percolation nanophase, have no gradient structures in the normal direction and hence exhibit identical materials properties on either side of the film. By contrast, the elastic conductor of the present invention is capable of conducting electricity and interacting with light and water in drastically different ways in the first region of the nanowire array as compared with the second region.

Without being bound by theory, it is believed that this behaviour is a due to the unique enokitake ("mushroom")-like nanowire structure comprising a head and a tail, causing the first region of the array nanowires to behave like bulk metal, while the second region behaves as a discontinuous nanophase. For example, the first region may be hydrophilic but the second region may be hydrophobic. The first region may reflect light, yet the second region may be a broadband super absorber. The second region may be less conductive but with tunable resistance. Importantly, an elastic conductor according to the present invention exhibits unusual mechatronic properties when stretched, bent and pressed.

Other aspects and preferred forms are disclosed in the specification and/or defined in the appended claims, forming a part of the description of the invention.

In essence, embodiments of the present invention stem from the realization that standing nanowire arrays can serve as elastic conductors, leading to the exceptional performances observed. In particular, it has been realised that although the nanowires are substantially vertical, they are also connected in such a way as to provide lateral conductivity and differing interactions with light and water in different regions of the nanowire array, and these are important features of these materials.

Advantages provided by the e-skin of the present invention comprise the following:

high intrinsic stretchability and durability without the need for extrinsic structural design;

can be ultrathin and ultralight;

high sensitivity to both strain and pressure;

good long term stability;

large workable strain range and ability to detect low static pressure;

ultrafast response time with minimal hysteresis;

electromechanical tunability, comparatively fast and simple fabrication, can be manufactured using a simple and efficient process that can readily be scaled up;

can be used for a multitude of applications.

Applications suitable for the e-skin of the present invention include the following:

medical and fitness monitors for biological functions including heart rate, respiration rate and blood pressure, biomedical implantable devices for controlling biological functions in response to stimuli, biomedical prostheses such as eardrum replacements, high performance, lifelike e-skins, soft robotics and soft electronics including artificial skin for prostheses, supercapacitors, stretchable electronics, stretchable light-emitting displays and other curvilinear systems, stretchable input interfaces such as keyboards/command boards, smart sensors for industrial processes.

Advantageously, the present invention allows medical and fitness monitoring a non-invasive manner around-the-clock.

Further scope of applicability of embodiments of the present invention will become apparent from the detailed description given hereinafter. However, it should be understood that the detailed description and specific examples, while indicating preferred embodiments of the invention, are given by way of illustration only, since various changes and modifications within the spirit and scope of the disclosure herein will become apparent to those skilled in the art from this detailed description.

BRIEF DESCRIPTION OF THE DRAWINGS

Further disclosure, objects, advantages and aspects of preferred and other embodiments of the present application may be better understood by those skilled in the relevant art by reference to the following description of embodiments taken in conjunction with the accompanying drawings, which are given by way of illustration only, and thus are not limitative of the disclosure herein, and in which:

FIG. 1 illustrates a strain scheme and characteristics of three different gold films—evaporated gold film (FIGS. 1A, 1B, 1C); lying-down nanowire conductor of the prior art (FIGS. 1D, 1E, 1F) and standing nanowire conductor (FIGS. 1G, 1H 1I) during the stretch-release process; Strain scheme from cross section view of (FIG. 1A) e-evaporated Au film, (FIG. 1D) lying-down nanowire conductor and (FIG. 1G) standing nanowire conductor, respectively; Microscopic behaviour of (FIG. 1B) e-evaporated Au film, (FIG. 1E) lying-down nanowire conductor and (FIG. 1H) standing nanowire conductor by optical microscope imaging at various strain (from 0%, 300% and back to 0%), respectively; Atomic-force microscopy (AFM) images and height plots of (FIG. 1C) evaporated gold film, (FIG. 1F) lying-down nanowire conductor and (FIG. 1I) standing nanowire conductor under 300% strain ($\varepsilon$), respectively. The height of the standing gold nanowires is 1.5 µm. (Scale bar: 200 µm; all optical images have the same resolution.)

FIG. 2 illustrates the superior stretch capacity of standing nanowire conductors.

FIG. 3 illustrates elastic conductors with gold nanowires of different heights (1.5 µm, 3.5 µm, 5 µm, 7 µm and 14 µm). SEM images from top view of (FIG. 3A) 1.5 µm, (FIG. 3B) 3.5 µm, (FIG. 3C) 5 µm, (FIG. 3D) 7 µm and (FIG. 3E) 14 µm gold nanowire height elastic conductors (Scale bar: 200 nm.); SEM images from cross section of (FIG. 3F) 1.5 µm, (FIG. 3G) 3.5 µm, (FIG. 3H) 5 µm, (FIG. 3I) 7 µm and (FIG. 3J) 14 µm gold nanowire height elastic conductors (Scale bar: 1 µm)

FIG. 11 illustrates dynamic pressure response at low and high pressure range.

FIG. 13 illustrates (FIG. 13A) a photograph showing the highly flexible properties of standing gold nanowire e-skins; and SEM images of (FIG. 13B) a top view and (FIG. 13C) a side view. Scale bar: 500 nm; (FIG. 13D) a photograph showing standing nanowires grown on polyurethane; SEM images of (FIG. 13E) low and (FIG. 13F) high resolution, respectively; (FIG. 13G) a photograph showing standing gold nanowires grown on flexible PDMS substrate and illustrating the patternable properties of standing nanowire-based conductors; (FIG. 13H) optical microscope image of the SNAs on skin-textured Ecoflex substrate.

FIG. 15 is a schematic illustration of a further method for fabrication of standing nanowire gold film on elastomers wherein (FIG. 15A) is a silicon wafer (100), (FIG. 15B) is the silicon wafer (100) after functionalisation and with gold nanowires (103) grown from the surface, (FIG. 15C) illustrates the further step of adding a layer of elastomeric substrate (105) to the surface of the silicon waver (100); (FIG. 15D) illustrates the elastomeric substrate (105) in which the nanowires (103) are embedded after the elastomeric substrate (105) has been peeled off the surface of the silicon waver (100); (FIG E) illustrates further growth of the existing nanowires (103).

FIG. 16 illustrates gold nanowires grown according to the method depicted in FIG. 15. Specifically, the figure illustrates optical images of the nanowires (A) on a silicon wafer, (B) embedded in PDMS substrate and (C) regrown on an elastomeric substrate known as PDMS, with corresponding SEM images (D, E, F).

FIG. 20 illustrates cross sectional SEM images of various assemblies of Au nanowires used in the elastic conductor of the present invention, the assemblies being head to head (FIG. 20A); tail to tail (FIG. 20B); and multilayered (FIG. 20C o); while

DETAILED DESCRIPTION

Figure 2A:
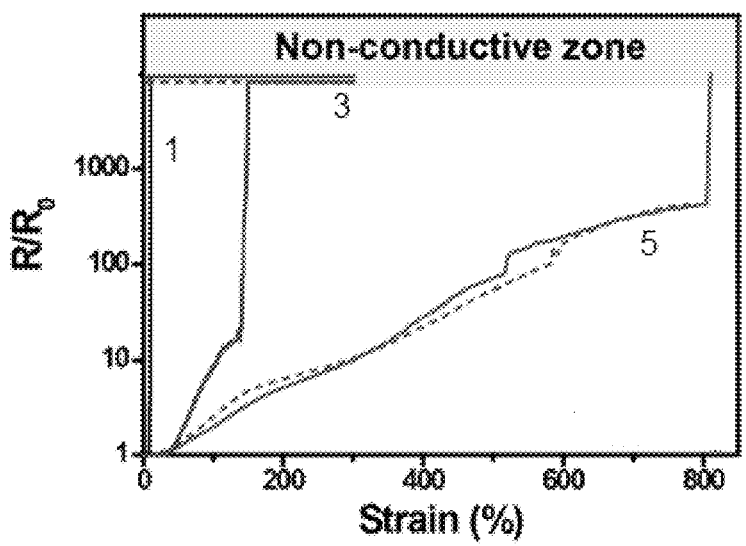
(FIG. 2A) stretch capacity comparison between e-evaporated Au film (1), lying-down gold nanowires (3) and a standing gold nanowires (5) (—stretching and—releasing)

The present invention provides an elastic conductor of exceptionally high intrinsic stretchability and durability provided by standing gold nanowire arrays. The way that electrons conduct and film stretches is distinct from previous nanowire-based random percolation systems.

The novel 3D-structured geometry enables its superior mechanical and electrical properties, demonstrating great capabilities as intrinsically stretchable energy storage material such as supercapacitors as well as highly sensitive smart sensors.

The elastic conductor of the present invention exhibits electron flow at their surface where nanoparticles are closely packed. Unlike conventional metal films (such as those made by vacuum evaporation/sputtering) which typically exhibit large 'cliff-like' cracks, the elastic conductor of the present invention instead exhibits tiny V-shaped cracks under the same level of strain (<200%). Even when large cracks appear under exceptionally large strain (>800%), percolation conductive pathways remain and the cracks can repair by themselves when the strain is reduced.

In addition, such super elastic thin film is crack-free at large strain ($\epsilon$<200%) and delamination-free at super large strain ($\epsilon$<800%). Without wishing to be bound by theory, this is a benefit derived mainly from the novel standing morphology of nanowires, where horizontal deformation of elastic substrates may only lead to distance changes between the nanowires without any damage to nanowire itself. As a result, the standing nanowire-based elastic conductor of the present invention is highly durable, with the conductivity retention maintained at >93% even after 2,000 cycles to 800% strain.

Again, without wishing to be bound by theory, the elastic conductor of the present invention also demonstrates novel electron transport mechanism, whereby electrons are mainly transported through compacted nanoparticles on top of standing nanowires. Consequently, the elastic conductor of the present invention shows unconventional electrical properties such as constant conductivity with the increasing of nanowire height and increased conductivity upon application of pressure.

The unprecedented mechanical and electrical properties of the standing nanowires could enable the development of intrinsically stretchable electronics such as stretchable supercapacitors.

FIGS. 1A, D & G illustrate the schematic morphological evolution of three different gold films during the stretching-releasing process: evaporated gold, lying-down nanowires and standing gold nanowires fabricated by e-beam evaporating, drop-casting and direct growth, respectively. The first two films develop large cracks and delamination during stretching, which results in permanent conductivity loss after releasing the strain.

Corresponding optical microscope images in FIGS. 1B & E show the dynamic surface morphology changes from 0% strain to 300% strain and back to 0% strain. Cracks appeared during strain increase and the distance between the islands became larger. After release, the fractured islands were unable to connect again. Atomic-force microscopy (AFM) images in FIGS. 1C & F indicate that interface debonding occurred under 300% strain for both evaporated Au film and lying-down gold nanowire conductor.

In contrast, standing nanowires firmly attached on the elastomer could move freely upon horizontal deformation of the substrates and recover completely after the strain was released without material delamination, as illustrated by the optical images shown in FIG. 1H. It is noted that the whole film was almost crack free up to 200% strain. Random cracks (diameter: 20 µm) perpendicular to the stretch direction were observed when the strain was further increased to 300%. Tiny cracks of 100-200 nm depth can be observed from high resolution AFM image (FIG. 1I), which supports the strain scheme proposed in FIG. 1G. The high mechanical properties of the nanowires enabled them to bend under strain, and return to vertical after the strain is released.

FIG. 2A illustrates the resistance changes as a function of strain for the three different gold films. The traditional planar structured gold films (evaporated gold film and lying-down gold nanowires) could only tolerate strains of 10% and 150% respectively and lost their conductivity permanently thereafter. However, the standing gold nanowire conductor of the present invention exhibited super elasticity and could be stretched up to 800% strain before electrically non-conductive. In addition, the conductivity was retained after release from strain of 800%.

Figure 2B:
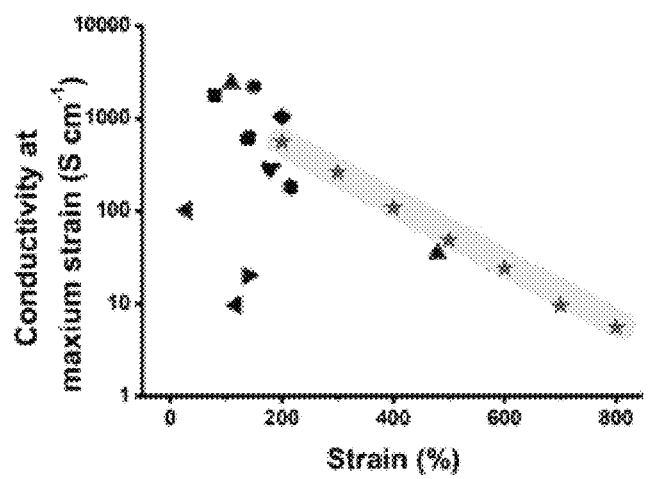
(FIG. 2B) a comparison of the present invention (stars) to prior art work in elastic conductors. Data points are extracted from the following papers: ▲ Au nanoparticles (Au NP)—the study by Kotov et al. (Nature 499, 458-463 (2013)); ● Ag nanowires (Ag NW)—the study by Vörös and Tybrandt. (Small 12, 180-184 (2015)); ■ gA nanowires (Ag NW)—the study by Xu and Zhu. (Advanced materials 24, 5117-5122 (2012)); ♦ carbon nanotube (CNT)—the study by Bao et al. (Nature Nanotechnol 6, 788-792 (2011); Д Ag nanoparticles (Ag NP)—the study by Kim et al (Nature nanotechnology 7, 803-809 (2012)); ▼ Au nanosheets (Au NS)—the study by Jeong et al. (Advanced Materials 25, 2707-2712 (2013)); o Ag flakes—the study by Someya et al. (Nature Communications 6, 7461 (2015)); ◄ Ag-CNT—the study by Someya et al. (Nature Materials 8, 494-499 (2009); ► Ag carbon nanotubes (Ag-CNT)—the study by Baik et al. (Nature nanotechnology 5, 853-857 (2010)); red filled star, this study (corresponds to A)
Figure 2C:
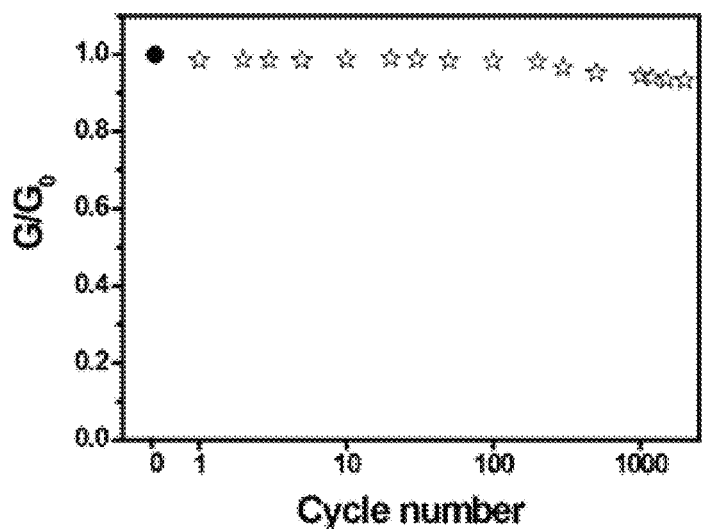
(FIG. 2C) conductance change of elastic conductor during 2000 cycles stretching/releasing to 800% strain (● Before strain; *—After strain).

The conductivities at the maximum sustainable strain for prior art stretchable conductors are compared in FIG. 2B. Standing nanowire conductors according to the present invention reach a high conductivity within a wide strain range from 0 to 800%, substantially higher than values reported for inorganic stretchable conductors of the prior art. Remarkably, the conductivity retention of the present invention remained >93% after stretching/releasing to 800% strain for 2,000 cycles (FIG. 2C), which is not achieved by stretchable conductors of the prior art reported without combining extrinsic structural design.

Without wishing to be bound by theory, the intrinsic elasticity of the elastic conductor of the present invention is mainly derived from the novel morphology of standing nanostructures as well as the good adhesion with the Ecoflex® substrate. It is noted that the stretchability of the present invention could be further extended to ~900% strain after encapsulation with another Ecoflex® layer on top, which is almost the breaking strain of Ecoflex® itself.

Figure 5:
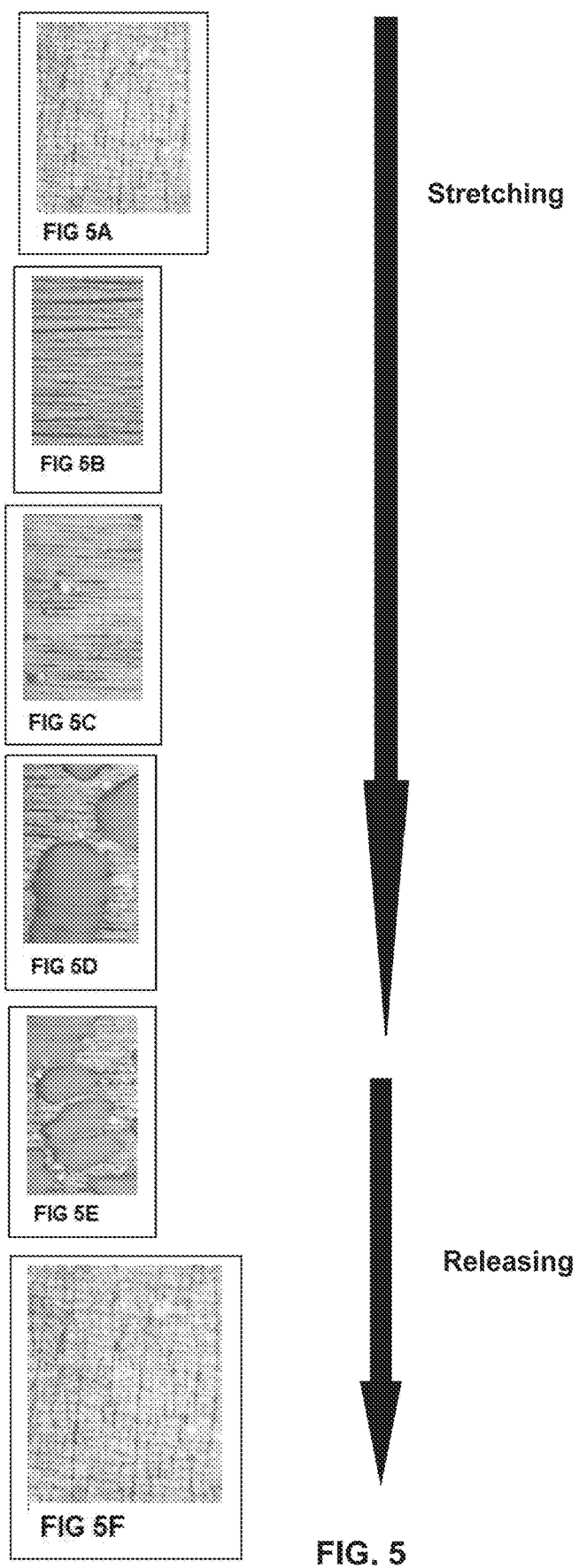
FIG. 5 illustrates the microscopic behaviour of standing gold nanowire conductors by optical microscope imaging at various strains (from pristine state (FIG. 5A), 100% (FIG. 5B), 300% (FIG. 5C), 500% (FIG. 5D), 800% (FIG. 5D) and back to 0% (FIG. 5F)), respectively. Scale bar: 20 µm.
Figure 6A:
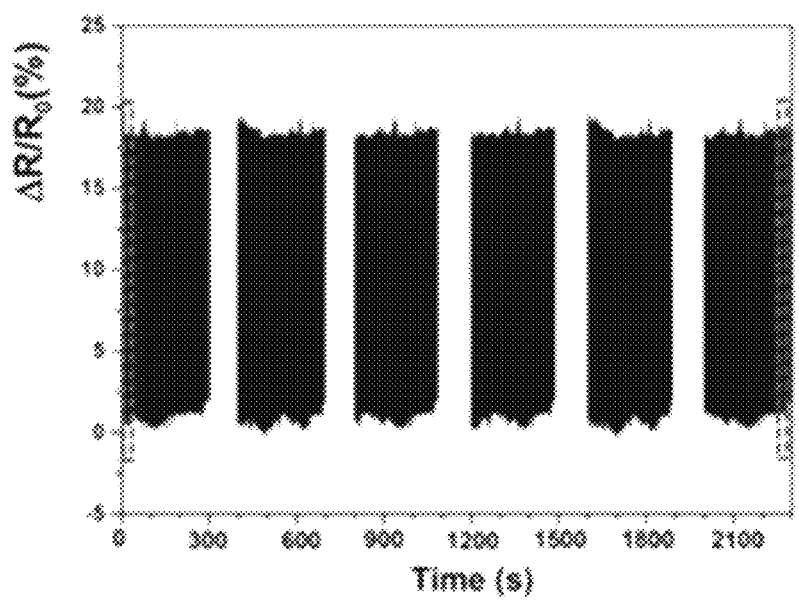
FIG. 6 illustrates the durability and stability performance of standing gold nanowire elastic conductors according to the present invention. Specifically it illustrates (FIG. 6A) the 60,000 cycling test (in six tests, each of 10,000 cycles) under 25% strain with a frequency of 1Hz.
(FIG. 6B) plots of resistance changes of 1-10 cycles and 59.990-60.000 cycles to show almost perfect overlay; nanowire height: 1.5 µm.
(FIG. 6C & FIG. 6D) SEM images of an elastic conductor (FIG. 6C, FIG. 6E) before and (FIG. 6D, FIG. 6F) after 60.000 cycles of stretching and releasing under strain of 185% with full recovery of surface morphology.
Figure 6B:
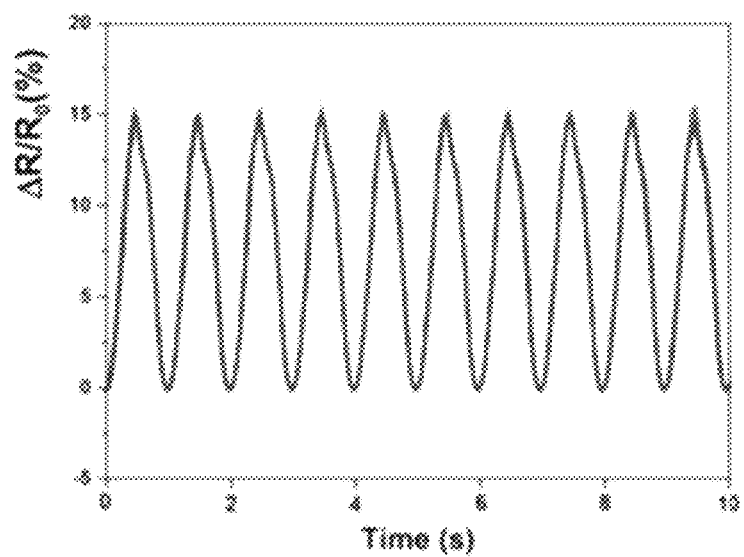
Figures 7A, 7B:
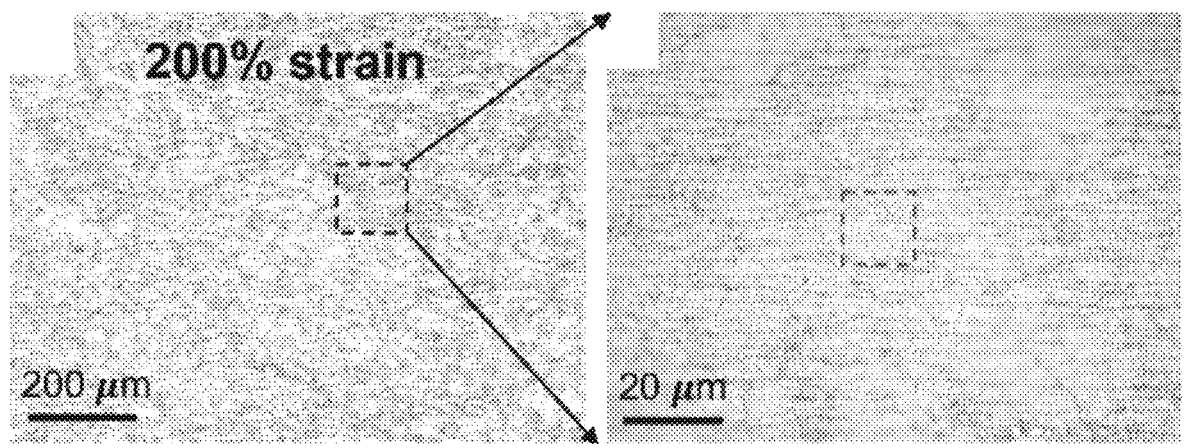
FIG. 7 shows optical microscopic images and corresponding AFM featuring a height plot of (FIG. 7A-FIG. 7D) 1.5 µm gold nanowire height and (FIG. 7E-FIG. 7H) 7 µm gold nanowire height under 200% strain, respectively. The first region (31) of nanowires is separated from the second region (33) adjacent the substrate surface by a distance of 7 µm.
Figure 7C:
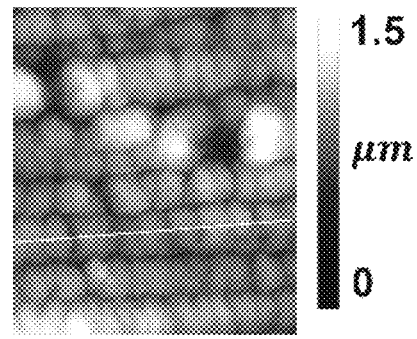
Figure 7D:
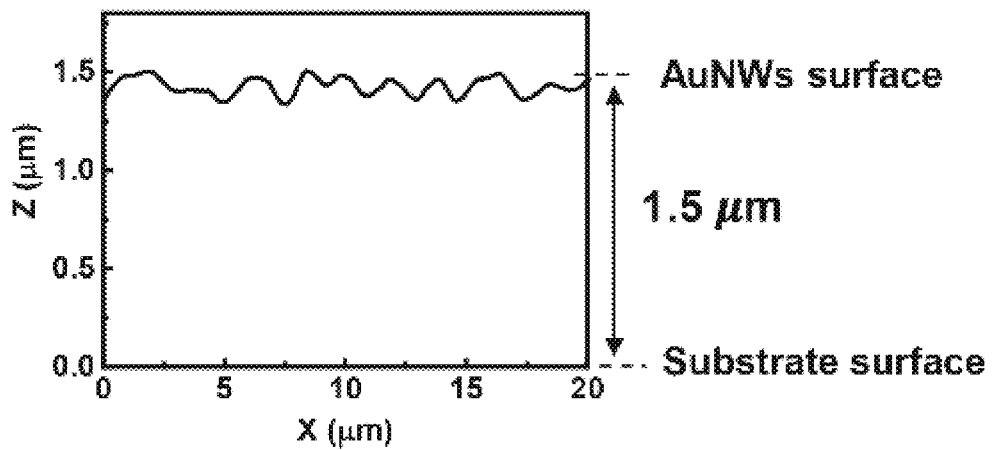
Figures 7E, 7F:
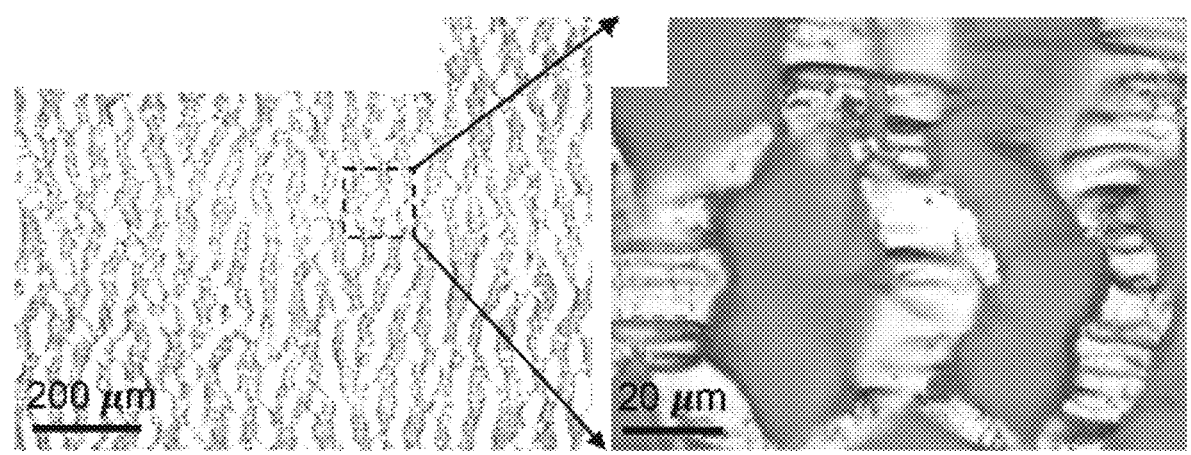
Figure 7G:
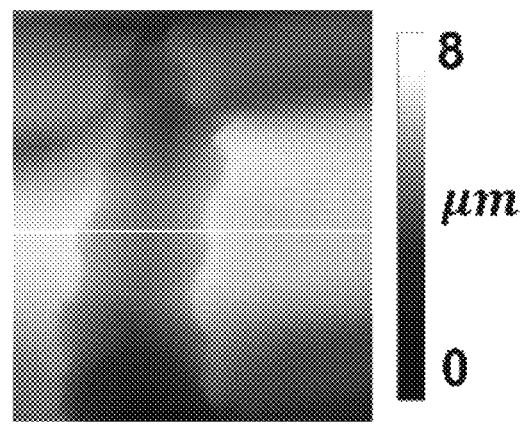
Figure 7H:
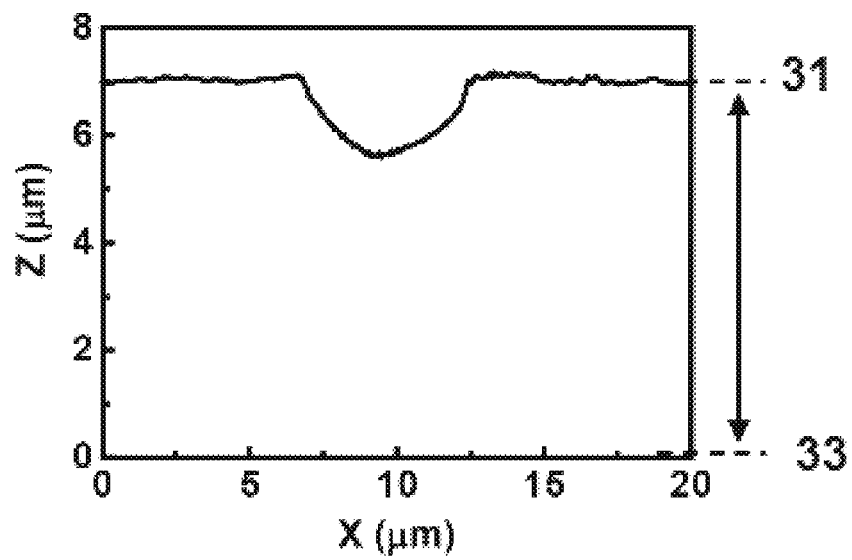

FIG. 5 shows the morphology changes of standing gold nanowire conductors by optical microscope imaging from 0%-800%-0% strain, the whole film remained conductive up to 800% due to connected gold nanowire islands. Under high level of strains, large cracks were observed for SNA-based films. However, cracked islands were not isolated but still interconnected, enabling the electron transporting through their percolation networks. Surprisingly, upon releasing strains, the large cracks could be repaired by themselves, leading to full recovery of conductivity. The consistent results were also obtained from SEM characterisations. By inspecting the same spot in a particular sample, negligible morphological changes were observed before and after 60,000 cycles of stretching/releasing to 182% strain (FIG. 6)

Figure 3K:
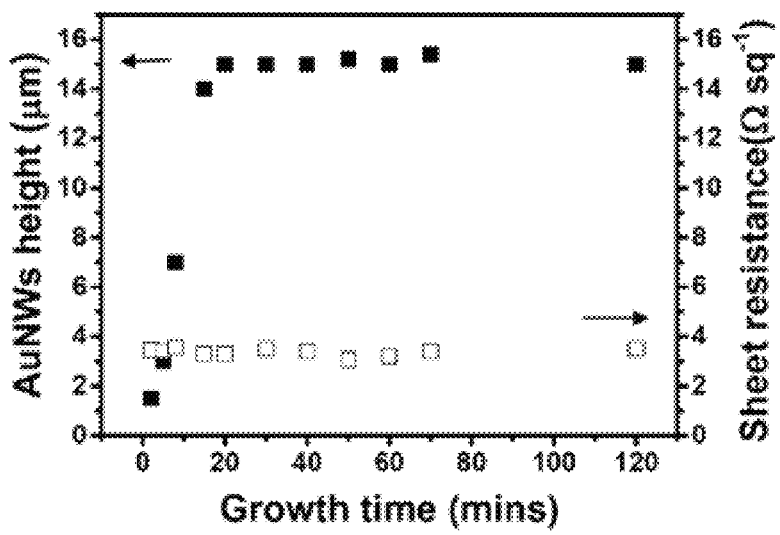
(FIG. 3K) height of gold nanowires versus sheet resistance under different growth time from 2 mins to 2 hours.

Unlike bulk gold film or percolation nanowire networks, standing nanowire conductors follow a distinct electron transport pathway. It appears that electrons transport predominantly via top surfaces where closely-packed nanoparticle arrays are present. This has been proved by comparing conductivities of standing nanowire conductors that have different nanowire heights. By controlling growth time ranging from 2 to 15 minutes, five different standing nanowire conductors were obtained with thickness of 1.5 µm, 3.5 µm, 5 µm, 7 µm and 14 µm (FIGS. 3A-J). The sheet resistance of all five conductors was almost the same (~3.5 $\Omega sq^{-1}$), which indicates that height of nanowires play a minor role in the overall film conductivity (FIG. 3K).

Figure 3L:
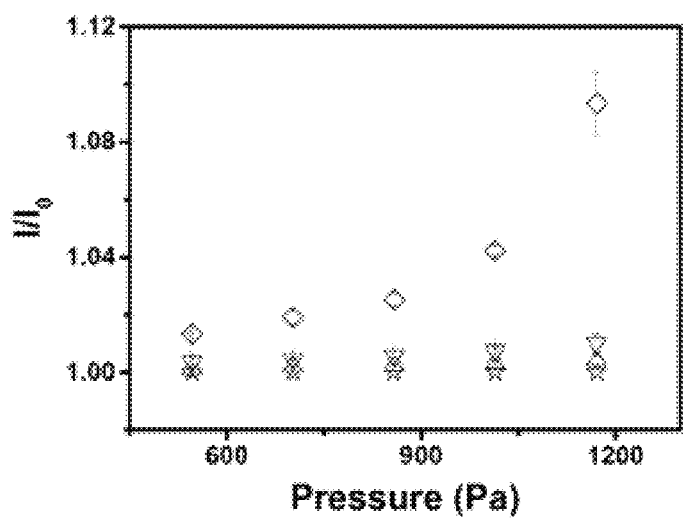
(FIG. 3L) corresponding electrical responses of different elastic conductors towards pressure (star—3.5 µm; ▲ 5 µm, ▼ 7 µm, ♦ 14 µm)
Figure 3M:
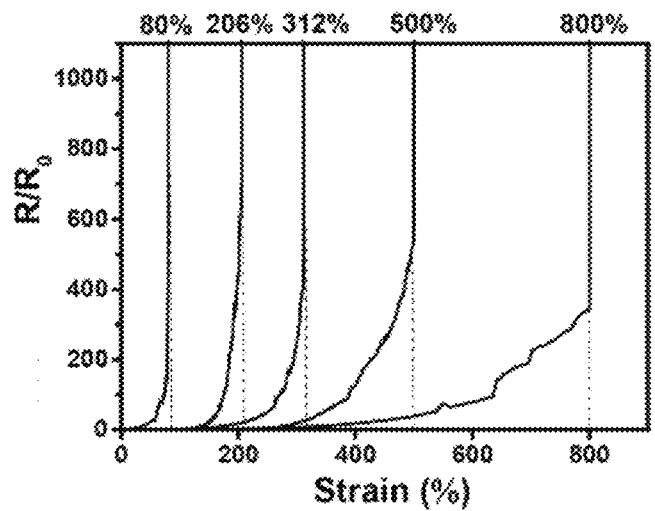
(FIG. 3M) durability performance under a pressure of 600 Pa at a pressure input frequency of 2 Hz for 20,000 cycles (Nanowire height: 5 µm) for (from left to right, 14 µm, 7 µm, 5 µm, 3.5 µm and 1.5 µm. SEM imaging was carried out using FEI Helios Nanolab 600 FIB-SEM operating at a voltage of 5 kV.
Figure 4:
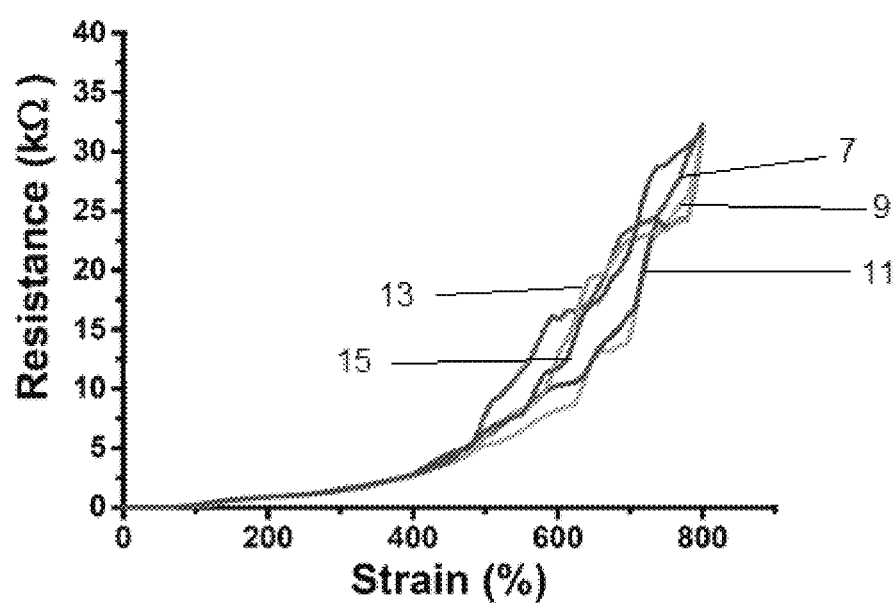
FIG. 4 illustrates long term stable electrical responses for standing gold nanowire conductors after storage at the ambient temperature without encapsulation for a fresh sample (7), after 1 week (9), after 7 weeks (11), after 25 weeks (13) and after 40 weeks (15), respectively. (Nanowire height: 1.5 µm).

The film conductivity increases slightly as external normal pressures are applied. This may be due to normal force-induced bending and crossing of vertical aligned gold nanowires, adding more electron transport pathways. As the nanowires get longer, the increase with normal pressures becomes more evident, indicating that longer nanowires may be more subject to deformation than short counterparts (FIG. 3L). Significantly, such conductivity enhancement is reversible after pressure is removed. We recorded the resistance changes under repeated pressure of 600 Pa at a frequency of 2 Hz and found that the high signal-to-noise ratios were well maintained and the current amplitude exhibited negligible changes with 20,000 loading-unloading cycles (FIG. 3M). This demonstrates the soft nature of standing gold nanowire layers, reflecting a spring-like elastic deformation behaviour.

Without wishing to be bound by theory it is believed that this phenomenon can be attributed to the pressure induced bending and crossing of vertically aligned standing gold nanowires, which means more electron pathways were created under pressure. The conductivity enhancement is reversible after pressure is removed.

Similar to the electrical response to pressure, elastic conductors made from taller gold nanowires appeared to be more sensitive to strain, but with lower ε max. Specifically, elastic conductors with the shortest gold nanowires (1.5 µm) can be stretched to 800% strain, whereas the conductors having the tallest gold nanowires (14 µm) could only reach 80% strain before becoming electrically non-conductive (FIG. 3N).

Without wishing to be bound by theory, it is postulated that the broad strain detection range and the ultrasensitive responses may be attributed to the high mechanical durability of the surface nanostructures as well as the effective contact between nanowires, respectively. The above results indicate the distinct conductivity mechanisms of standing nanowire-based conductors during strain. For evaporated gold film, electrons can transport throughout its surface and interior uniformly without strain. However, the smooth electron transport pathways are easily blocked upon stretching, due to cracking of the rigid gold film which has a Young's modulus five orders of magnitude higher than that of the underlying elastomeric substrate. Simultaneously, cracking gold flakes delaminate from elastomers due to the poor adhesion, rending it impossible to recover the conductivity when stress is fully released. Conductors having lying-down gold nanowires follow the similar mechanism and percolation conductivity pathways are blocked under strains due to delamination and cracks. The difference is that their apparent Young's modulus is closer to that of supporting elastomeric substrate, therefore, the percolation films can survive up to higher strain level.

Unlike bulk gold film or percolation nanowire films, standing nanowire conductors possess hierarchical mechanical properties: the top layer consists of closely-packed nanoparticle arrays, which may have a higher apparent stiffness than that of underlying nanowire arrays. Upon applying external stress, the nanowire arrays may experience 'accordion-fan-like' unzipping process. The unzipped structures can zip back again once stretching forces are fully released. This explains well the tiny cracks observed under low strains (<300%) observed. Since top nanoparticle layers are stiffer than nanowire layers, they tend to crack more easily, hence, leading to V-shaped tiny cracks observed in AFM imaging. Under very high strains, the whole standing nanowire conductor will crack but still strongly adheres to the supporting elastomer substrate without delamination due to strong chemical bonding interactions where APTMS may serve as a nanoscale adhesive. This explains the full 'crack repairs' and conductivity recovery following reduction of large strains back to zero.

Based on the described sensing performance in response to strain, it may be possible to use shorter length nanowires in elastic conductors for applications that require stable conductance upon stretching such as supercapacitors, and longer nanowires in elastic conductors for applications that require large conductance changes upon stretching such as smart wearable sensors.

In addition, the superior mechanical and electrical properties of the standing nanowire conductor is maintained even after 40 weeks of storage in ambient conditions without encapsulation, indicating good environmental stability of elastic conductors according to the present invention. This indicates their potential applications in soft electronics.

As the first proof of concept, soft stretchable supercapacitors were fabricated by assembling two standing gold nanowire (1.5 µm in thickness) conductors with poly(vinyl alcohol) (PVA)/$H_3PO_4$ electrolytes in between. The cyclic voltammetry (CV) curves (FIG. 8) for the supercapacitor exhibited an excellent capacitive behaviour across the full range of the scan rate from 0.02 V $s^{-1}$ to 1V $s^{-1}$. These results indicate that the supercapacitor can endure very high voltage/current change rates, which is believed to be a result of the effective electrochemical dynamic processes in the standing gold nanowire electrodes.

Figure 8A:
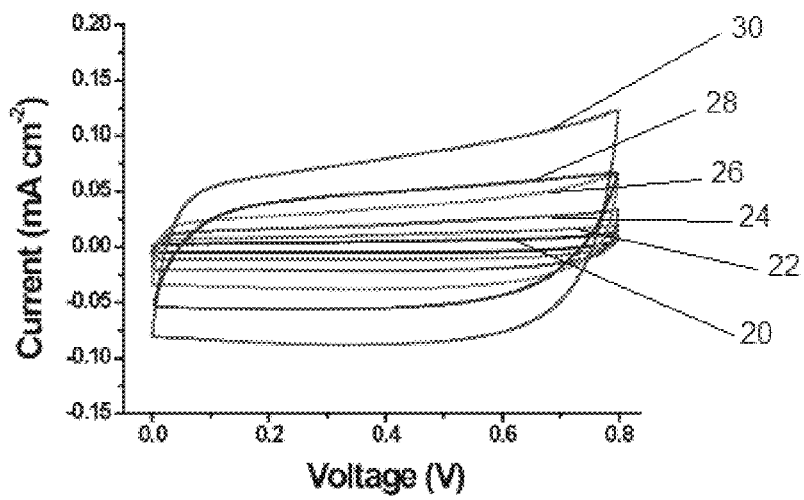
FIG. 8 illustrates (FIG. 8A) cyclic voltammetry (CV) curves of the supercapacitors based on standing gold nanowires at different scan rate (0.02 V/s (20), 0.05 V/s (22), 0.1 V/s (24), 0.2 V/s (26), 0.5 V/s (28), 1 V/s (30))
(FIG. 8B) galvanostatic charging-discharging curves of the supercapacitors at a constant current of 0.1 mA (32), 0.2 mA (34) and 0.5mA (36), respectively.
(FIG. 8C) the calculated area capacitances of the supercapacitor using both CV (38) and GCD (40) curves, respectively.
Figure 8B:
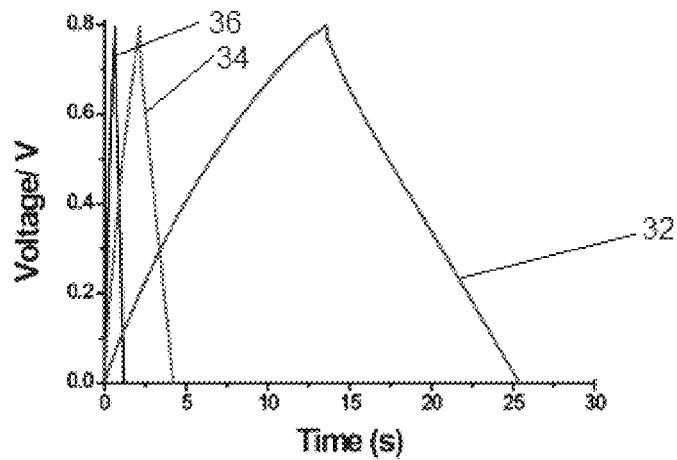
Figure 8C:
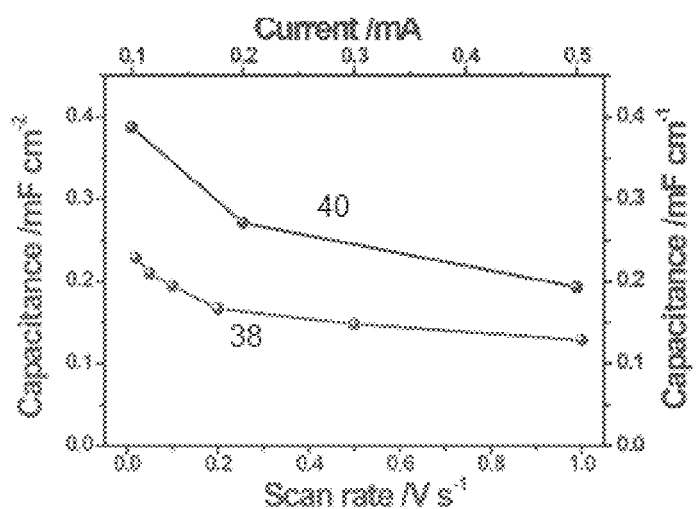
Figure 9A:
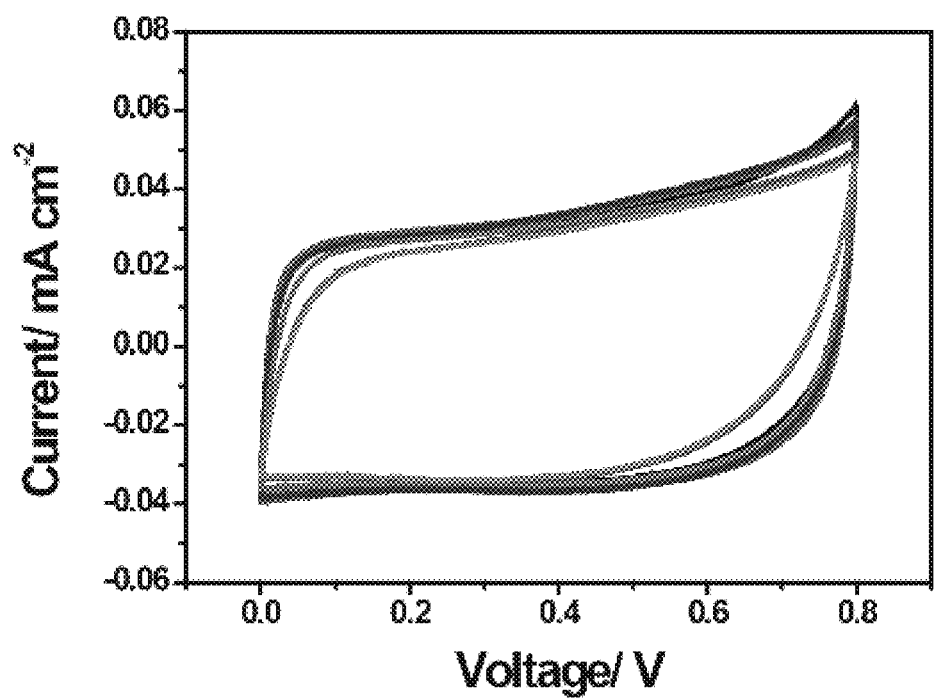
FIG. 9 illustrates (FIG. 9A) depicting CV curves of the standing gold nanowire based supercapacitor for applied strains up to 250% and a scan rate of 100 mV s$^{-1}$ (0%, 20%, 40%, 60% 80%, 100%, 150%, 200% 250%.
(FIG. 9B) normalized surface-specific capacitance of the supercapacitors as a function of tensile strains—the last point representative of >84% under 250% strain.
(FIG. 9C) CV curves of the supercapacitor with different stretching cycles (0, 1, 5, 10, 20, 50, 100, 200 cycles) at a scan rate of 100 mV s$^{-1}$.
(FIG. 9D) normalized surface-specific capacitance as a function of stretching cycles each point indicating tensile strain of 200%.

The galvanostatic charge/discharge (GCD) curves at various currents from 0.1 to 0.5 mA (FIG. 8B), do not exhibit any obvious IR drop under all the charging/discharging conditions. The areal capacitances were calculated using both these CV and GCD curves (FIGS. 8C-D). Furthermore, supercapacitors based on standing gold nanowire conductors according to the present invention were remarkably insensitive to strain over an applied tensile strain range between 0% and 250%, with the CV curves for 0% to 150% almost overlapped (as shown in FIG. 9A). The capacitance slightly increased by 5% as the tensile strain increased from 0 to 100%, presumably because of the strain-induced enhancement in the contact between the two electrodes upon stretching.

Figure 9B:
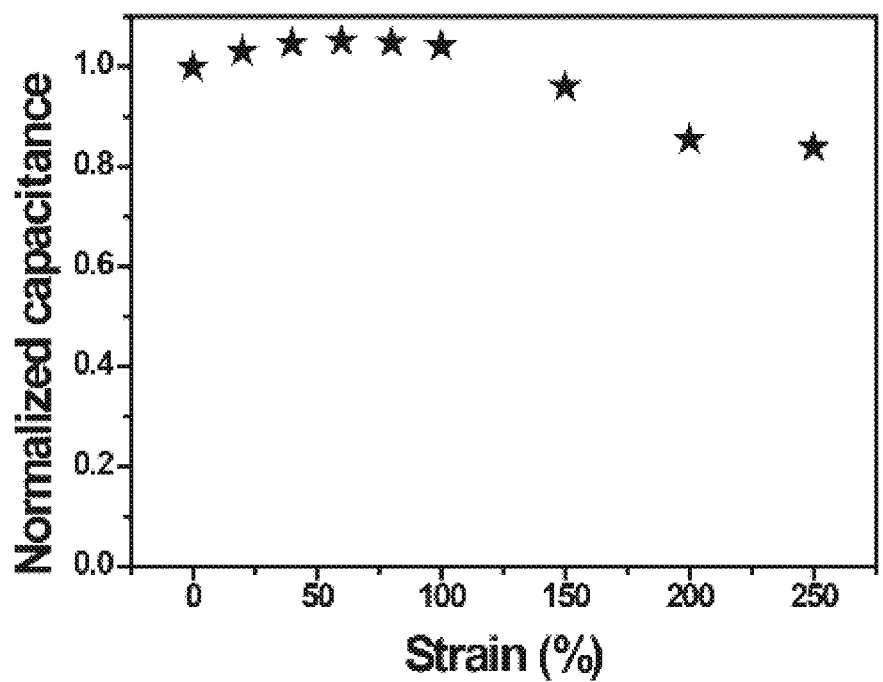
Figure 9C:
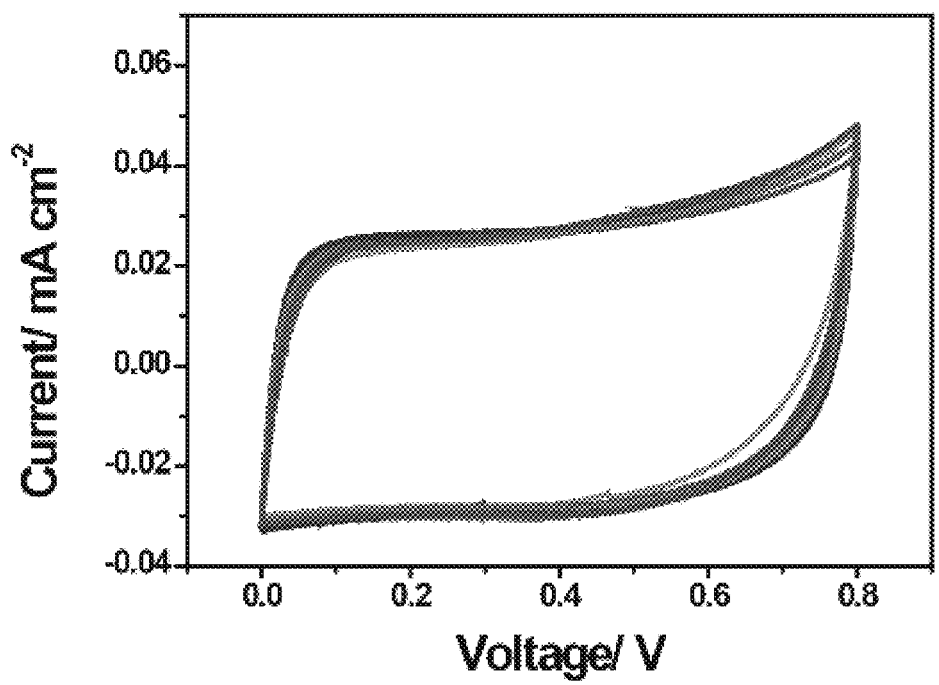
Figure 9D:
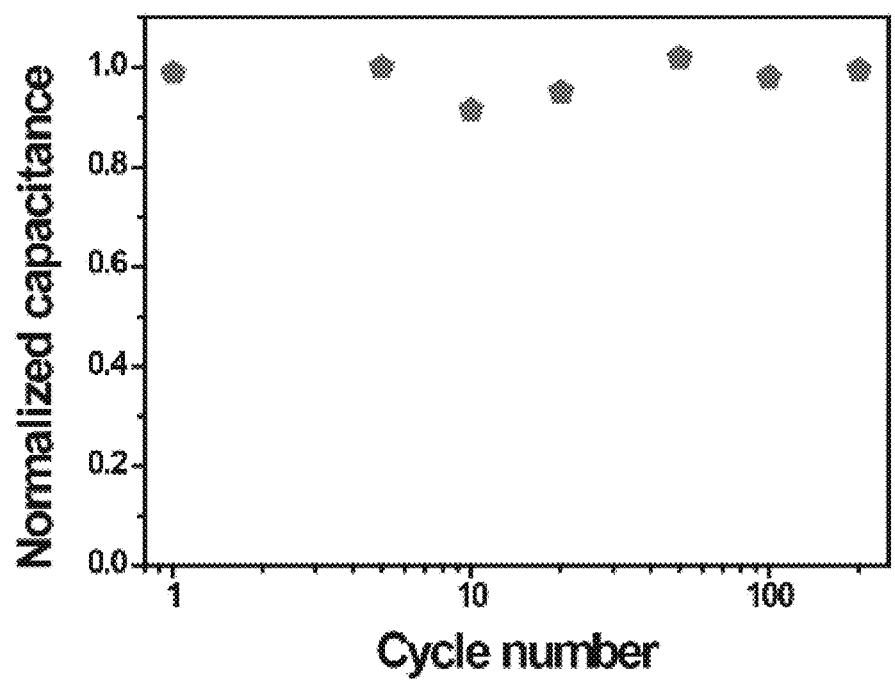

Further stretching beyond the 100% strain caused a tiny decrease in the capacitance and finally kept 84% of original capacitance at strain of 250% (FIG. 9B). The degradation of capacitance is possibly due to the conductivity decreases of electrodes and deformation of the PVA/$H_3PO_4$ electrolyte upon over stretching. FIGS. 9C-D show the dependence of specific capacitance on stretched number with strain of 200%, and the capacitance has been maintained by 99% after stretching for 200 cycles. The well-maintained structure and superior conductivity resilience of standing gold nanowire conductors can also explain the stable electrochemical properties upon repeated stretching.

Figure 10A:
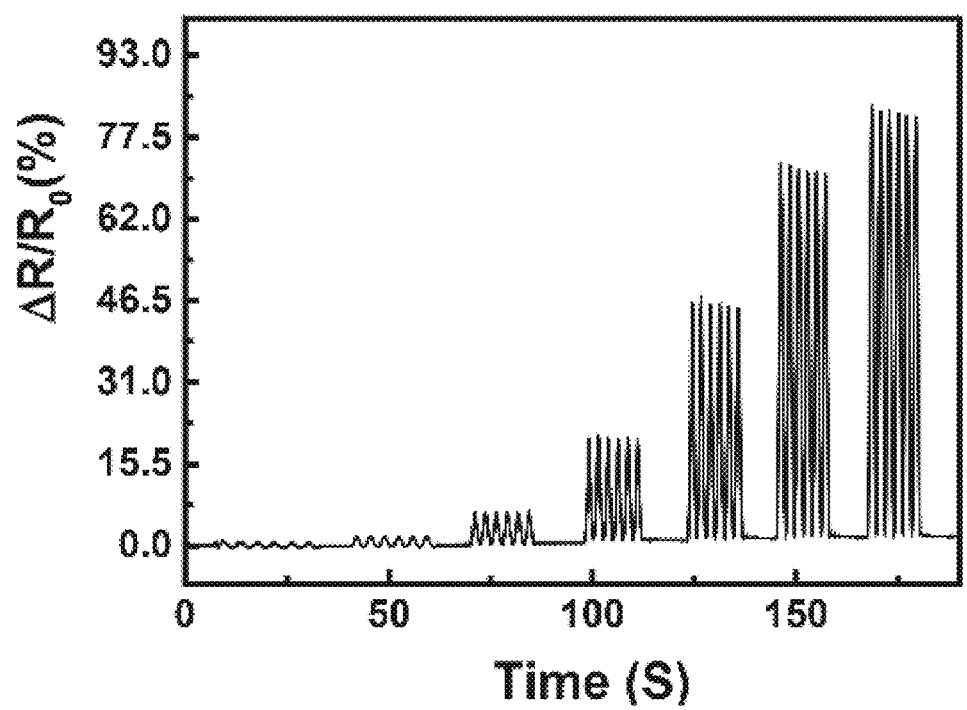
FIG. 10 illustrates (FIG. 10A) plots of resistance change for elastic conductors of the present invention under strain range (from left to right) of 1%, 3%, 5%, 7%, 15%, 25% to 30%.
(FIG. 10B) gauge factor as a function of strain (1%-150%). Gold nanowire height: 7 μm.
Figure 10B:
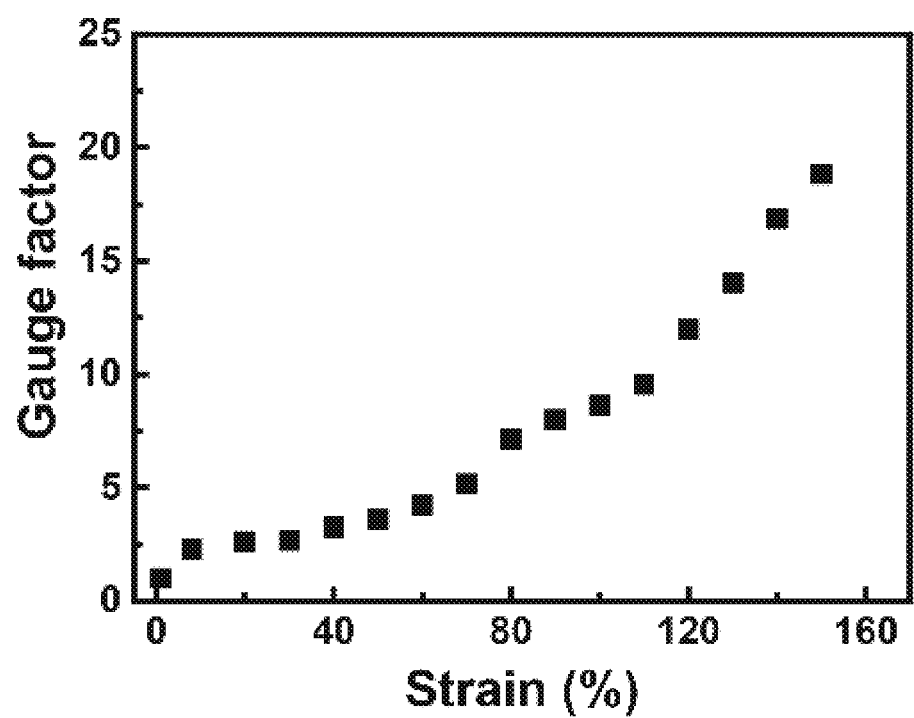
Figure 11A:
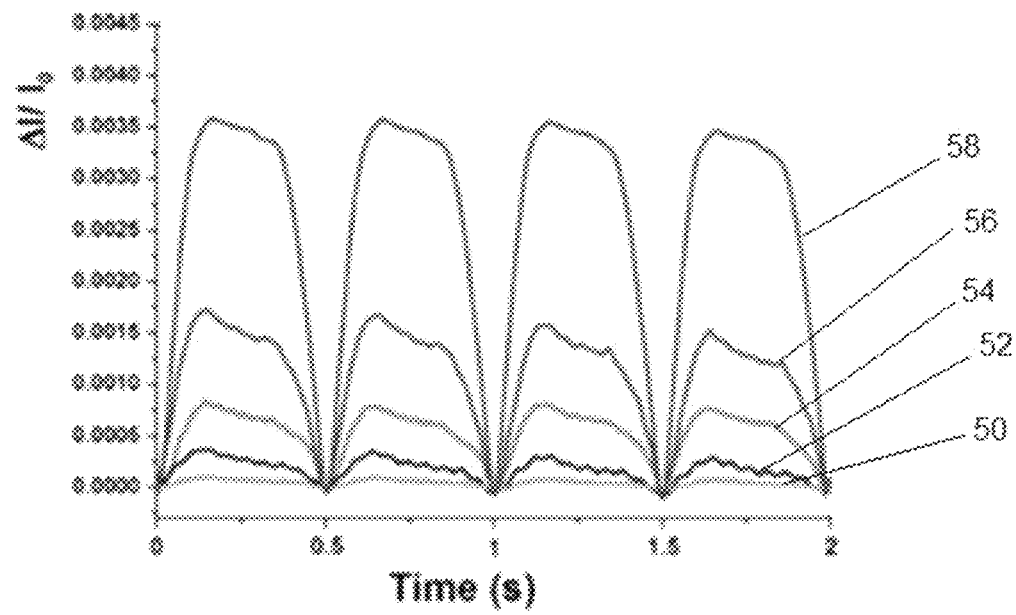
(FIG. 11A) is a plot of current response as a function of time for five applied pressures (2.77 Pa(50), 5.58 Pa (52), 16.4 Pa (54), 26.7 Pa (56) and 65.2 Pa (58)
Figure 11B:
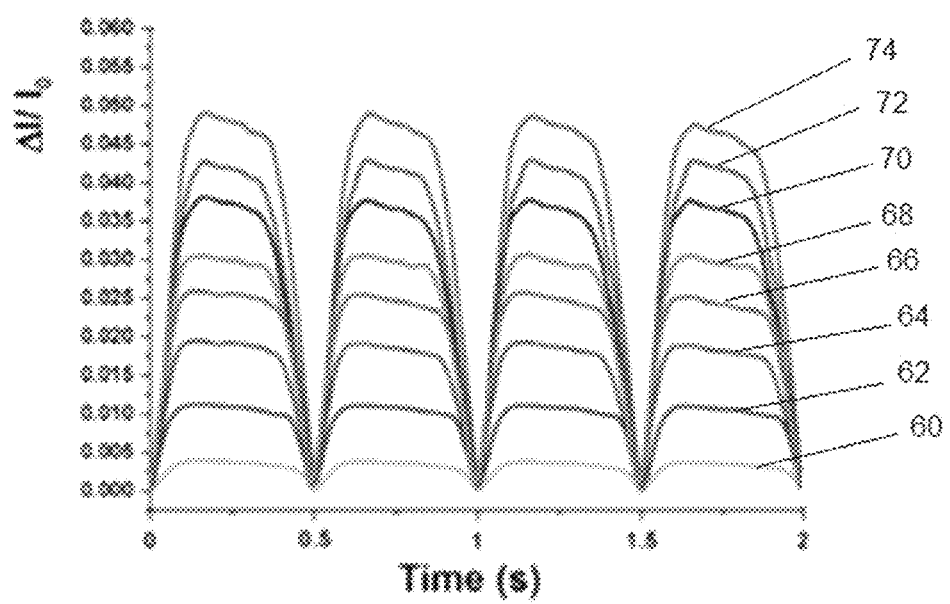
(FIG. 11B) is a plot of current response of the sensor as a function of time for the applied pressures of 70.8 Pa (60), 199.7 Pa (62), 335.5 Pa (64), 419.4 Pa (66), 520.3 Pa (68), 640 Pa (70), 762 Pa (72), 905.1 Pa (74). Pressure input frequency: 2 Hz, 'H' sensor size: 12.5 mm-12.5 mm, input voltage: 1V.
Figure 11C:
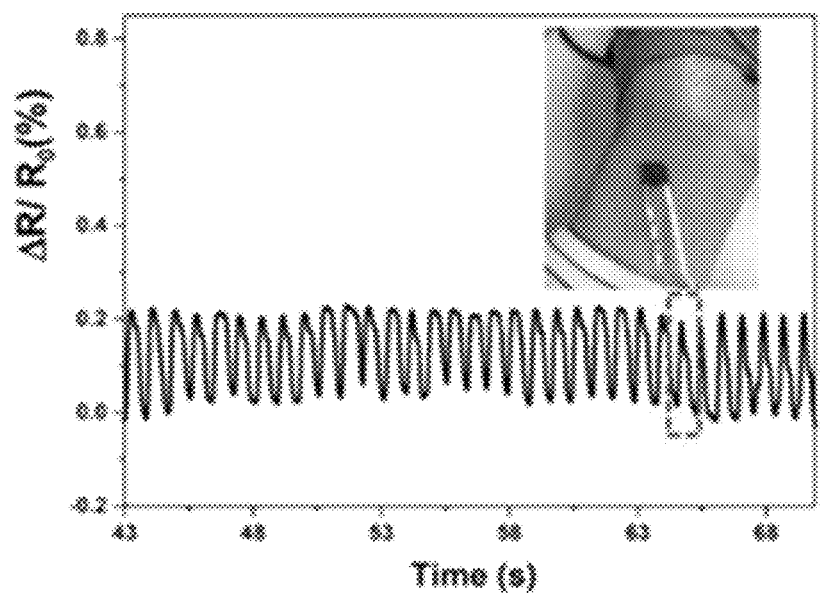
(FIG. 11C) illustrates real-time monitoring of human wrist pulse wave corresponding to the plots in FIG. 11A and FIG. 11B.
Figure 11D:
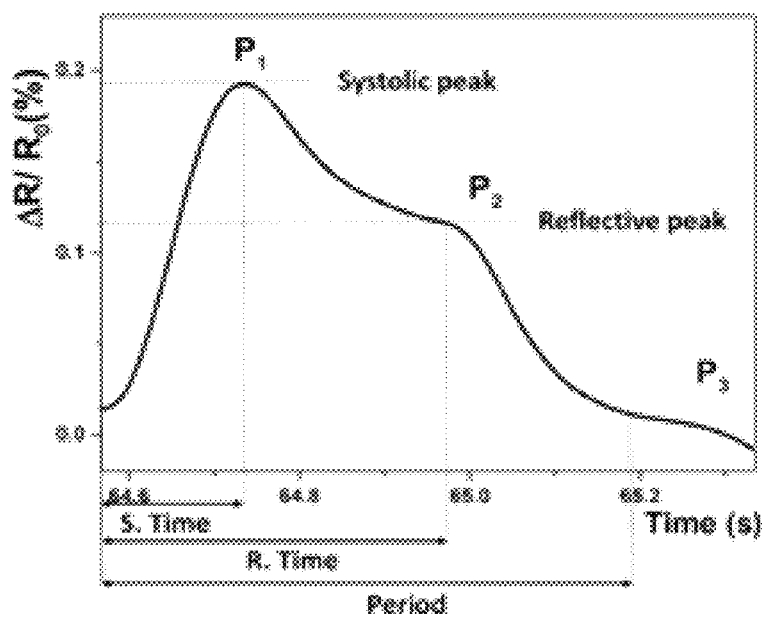
FIG. 11D is a magnified view of one particular waveform as shown in FIG. 11A and FIG. 11B.
Figure 12A:
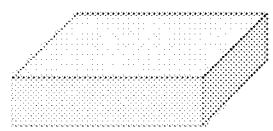
FIG. 12 is a schematic illustration of the fabrication standing nanowire gold film on elastomers wherein (FIG. 12A) illustrates the formation of a thin film of elastomeric substrate.
(FIG. 12B) illustrates coating with a layer of amino groups (positively charged) on the surface of the elastomeric substrate after plasma treatment.
(FIG. 12C) illustrates attachment of small citrate-stabilized colloidal gold particles (negatively charged)
(FIG. 12D) illustrates the standing nanowires with their tails adjacent the surface of the substrate and grown by contacting the colloidal gold particles with the nanowire growth solution.
Figure 12B:
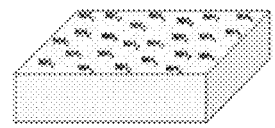
Figure 12C:
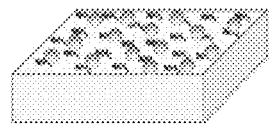
Figure 12D:
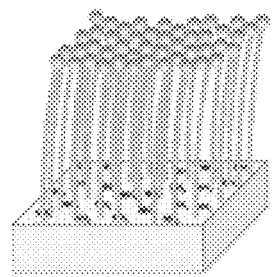
Figure 14:
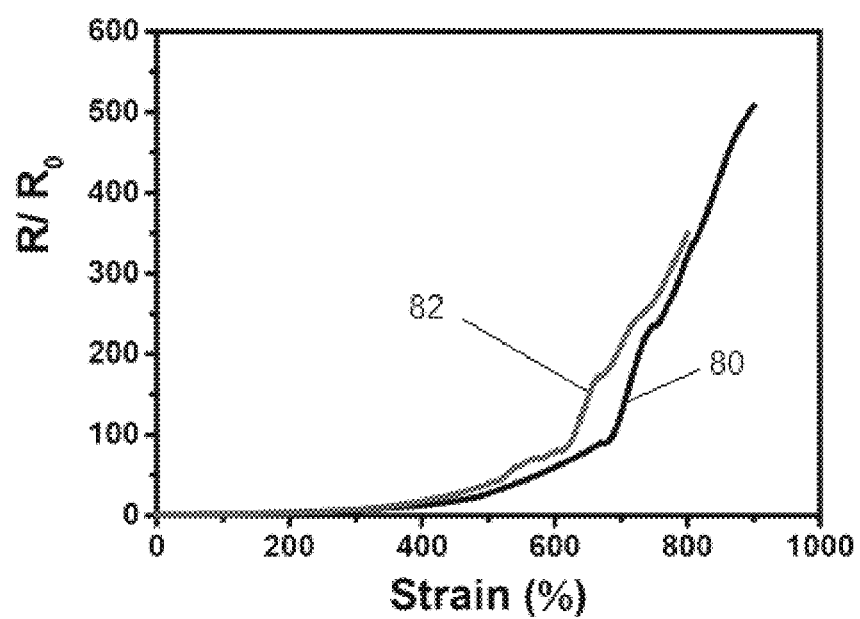
FIG. 14 illustrates the Electrical responses of encapsulated standing gold nanowire conductors (80) and non-encapsulated standing gold nanowire conductors (82). (Nanowire height: 1.5 μm).

FIG. 10A shows stable electrical responses for wide workable strain range from 0% to 30% with gold nanowires having a height of 7 µm. It is noted that the strain sensitivity could reach 19 while stretching to 150% strain (FIG. 10B). Specifically, the gauge factor could reach as high as 340.2 at strain of 206% (calculated from FIG. 3N).

Fabrication

Using a seed-mediated approach (He et al, Acs Nano 7, 2733-2740 (2013), standing nanowire-based gold films could be grown on a wide range of elastomeric substrates including polyethylene terephthalate (PET), polydimethylsiloxane (PDMS), siloxanes such as Ecoflex® and polyurethane. FIG. 12 illustrates the fabrication process of standing nanowire-based gold films.

Typically, as a first step the elastomeric substrate is treated by $O_2$ plasma to render its surface hydrophilic with exposed hydroxyl groups. The second step comprises functionalisation of the substrate, such as with an amino group by silinization reaction. APTMS (3-aminopropyl) trimethoxysilane (APTMS) solution is one possible functionalisation agent although others will be readily apparent to those skilled in the art. Functionalisation enables immobilisation of seed particles from a growth solution via electrostatic interactions.

The chemically modified elastomer is seeded by immersion into a seed solution. For example, the seed solution may comprise excess citrate-stabilized Au seeds (3-5 nm). Rinsing removes any weakly bound seed particles from the elastomer surface.

Finally, the seed particles remaining anchored in the substrate are contacted with a growth solution. In a preferred embodiment the growth solution comprises MBA, $HAuCl_4$ and L-ascorbic acid leading to the formation of a standing nanowires array.

Top-down and cross-sectional views demonstrate the presence of highly-aligned nanowires with closely-packed nanoparticles on the top. Typical number density is ~1.31× 104 $\mu m^{-2}$ with nanowire diameter of 7.8±1.5 nm and nanoparticle size of 9.3±2.1 nm. The nanowire length depends on the growth reaction time. Typical gold nanowire heights of ~1.5 µm, ~3.5 µm, ~5 µm, ~7 µm and ~14 µm, have been obtained by adjusting the growth time to 2, 4, 5, 8 to 15 minutes, respectively.

Macroscopically, the standing gold nanowire conductors of the present invention are uniform with shiny, golden reflection when the elastomeric substrates are flat. The growth process is scalable to any elastomeric substrate sizes and even to textured skin replicas. For example, standing gold nanowires formed on thin Ecoflex sheets can naturally attach to human skin wrinkles before and after stretching.

Materials: Gold (III) chloride trihydrate ($HAuCl_4 \cdot 3H_2O$, 99.9%), Triisopropylsilane (99%), 4-Mercaptobenzoic acid (MBA, 90%), (3-Aminopropyl)trimethoxysilane (APTMS), sodium citrate tribasic dihydrate (99.0%), L-ascorbic acid, Poly (vinyl alcohol) (PVA) powder, $H_3PO_4$, and ethanol (analytical grade) were purchased from Sigma Aldrich. All solutions were prepared using deionized water (resistivity >18 $M\Omega \cdot cm^{-1}$). All chemicals were used as received unless otherwise indicated. Conductive wires were purchased from Adafruit.

Polydimethylsiloxane (PDMS) substrates were made by the mixing of the prepolymer gel (Sylgard™ 184 Silicone Elastomer Base) and the cross linker (Sylgard™ 184 Silicone Elastomer Curing Agent) at the weight ratio of 10:1. The mixture was poured on a 6-inch flat-plate petri dish using 0.5 mm-height shims as spacers and cured at 65° C. for 2 h in an oven.

Ecoflex substrates were made by pouring Ecoflex™ curable silicone fluid (Smooth-On Ecoflex™ 00-30) into a 6" flat-plate petri dish and curing under room temperature for 4 hours.

Synthesis of 2 nm gold nanoparticles: 0.147 mL 34 mM sodium citrate was added into conical flask with 20 mL $H_2O$ under vigorous stirring. After 1 min, 600 µL of ice-cold, fleshing prepared 0.1M $NaBH_4$ solution was added with stirring. The solution turned brown immediately. The solution was stirred for 5 min and then stored at 4° C. until needed.

Synthesis of ultrathin gold nanowires (for lying down AuNWs film): 44 mg $HAuCl_4 \cdot 3H_2O$ was added into 40 ml hexane, followed by addition of 1.5 ml oleylamine (OA). After completely dissolving the gold salts, 2.1 ml triisopropylsilane was added into the above solution. The resulting solution was left to stand for 2 days without stirring at room temperature until the colour turned from yellow into dark, indicating the formation of gold nanowires. The residue chemicals were removed by repeated centrifugation and thorough washing using ethanol/hexane (3/1, v/v) and finally concentrated to a 2 ml stock solution in hexane.

Growth of ultrathin gold nanowires on elastomers: Ultrathin gold nanowires were grown on Si wafer as described by He et al (ACS nano 7, 2733-2740 (2013)).

On PDMS: A PDMS film (20 mm×10 mm) with a thickness of ~500 µm was pretreated with air plasma for 3 mins to improve its surface hydrophilicity. The film was then functionalized with an amino group by reacting with APTMS solution (5 mM) for 1 h. Subsequently, the PDMS film was soaked in excess citrate-stabilized Au seeds (3-5 nm) solution for 2 hours to ensure the adsorption of Au seeds and rinsed with water four times to remove the excess Au seeds. Then, the PDMS substrates were floated onto the surface of the growth solution for 8 mins with the APTMS-functionalized side facing downward in the solution for the uniform growth of gold nanowires without the formation of any precipitates. The gold nanowire growth solution contained ligand MBA (550 µM), $HAuCl_4$ (6.8 mM), and L-ascorbic acid (16.4 mM). Finally, the PDMS film was rinsed with water four times and dried naturally.

On PET: A PET film (20 mm×10 mm) was pre-treated with air plasma for 2 min to improve its surface hydrophilicity. The fabrication of standing gold nanowires grown on PET was similar to growing gold nanowires on PDMS film as described in the previous paragraph.

On Ecoflex™: An Ecoflex™ film (20 mm×10 mm) with a thickness of 20-30 µm and 500 µm was pre-treated with air plasma for 17 min to improve its surface hydrophilicity. The fabrication of standing gold nanowires was similar to growing on PDMS film which was described in the previous paragraph. Conductors having gold nanowires of various heights (1.5 µm, 3.5 µm, 5 µm, 7 µm and 14 µm) were made by changing the growth time over a range of times from 2, 4, 5, 8 to 15 minutes.

On skin-textured Ecoflex™: As a first step, human skin was used as mold to achieve a skin-textured Ecoflex™ replica with a thickness of 20-30 µm. The fabrication of standing gold nanowires on Ecoflex was similar to growing nanowires on smooth Ecoflex™ film which as described in the previous paragraph.

On elastic thread: A string of elastic thread (20 mm) was pre-treated with air plasma for 8 min to improve its surface hydrophilicity. The fabrication of standing gold nanowires on elastic thread was similar to growing gold nanowires on PDMS film which as described in the previous paragraph.

Fabrication of the e-beam evaporated Au film: An electric beam evaporator (Intivac Nanochrome™ II, 10 kV) was used to achieve a conductive Au (thickness: 100 nm) film from Ecoflex™ substrate (thickness: 500 µm). The film was cut into 30 mm×3 mm shapes and conductive wires were afixed to achieve an e-evaporated Au film.

Fabrication of lying-down gold nanowire conductors: Ecoflex™ substrate (thickness: 500 µm) was drop coated 10 times with gold nanowires in hexane solution. The substrate was then cut into 30 mm×3 Min shape after naturally drying and fixed conductive wires were attached to produce a lying-down structured gold nanowire films.

44 mg $HAuCl_4 \cdot 3H_2O$ was added into 40 ml hexane, followed by addition of 1.5 m Oleylamine (OA), After completely dissolving the gold salts, 2.1 ml Triisopropylsilane was into the above solution. The resulting solution was left to stand for 2 days without stirring at room temperature until the colour turned from yellow into dark, indicative of the formation of gold nanowires. The residue chemicals were removed by repeated centrifugation and thorough washing using ethanol/hexane (3/1, v/v), and finally concentrated to a 2-ml stock solution in hexane. The lying-down gold nanowire films could then be obtained by a simple drop-casting approach.

Fabrication of supercapacitors: The elastic conductor was cut into small pieces with suitable shapes and sizes. A gel solution which contained PVA powder (1.0 g) and $H_3PO_4$ (1.0 g) in water (10.0 ml) was coated on top of the prepared films and dried in air for 5 hours. Conductive wires were then fixed to a pair of the elastic conductor and assembled face-to-face to form a supercapacitor.

Sensor characterisation: Electron imaging was carried out using FEI Helios Nanolab 600 FIB-SEM operating at a voltage of 5 kV. The sheet resistances of standing gold nanowire conductors were carried out on a Jandel four point conductivity probe by using a linear arrayed four point head. To test the electro-mechanical responses for strain sensing, the two ends of the samples were attached to motorized moving stages (THORLABS Model LTS150/M). Then uniform stretching/releasing cycles were applied by a computer-based user interface (Thorlabs APT user), while the current changes were measured by the Parstat 2273 electrochemical system (Princeton Applied Research). Similar setups were used for human wrist pulse sensing. For the analysis of detailed pressure responses (response time, current changes and hysteresis), a computer-based user interface and a force sensor (ATI Nano17 Force/Torque Sensor, 1/80N resolution without filtering) and a Maxon Brushless DC motor using a high resolution quadrature encoder (15 μm of linear resolution) were used to apply an external pressure up to 2.000 Pa with frequency up to 7 Hz.

Fabrication of Partially Embedded Nanowire-Based Elastic Conductor

In a further embodiment of fabrication methods according to the present invention standing gold nanowire-based elastic conductors were fabricated with a proportion of the gold nanowires encapsulated within an elastomer. The method is depicted schematically in FIG. 15.

The first step requires preparation of a relatively nonelastomeric growth surface such as a silicon wafer. The surface of a 4 inch silicon wafer was pre-treated with piranha solution ($H_2O_2$:$H_2SO_4$, 1:3) for 10 min to improve its surface hydrophilicity and then functionalized with amino group in (3-aminopropyl)triethoxysilane (APTES) solution for 1 hour. The functionalised wafer was immersed in 100 mL citric-stablized Au seed solution for 2 hours to ensure sufficient adoption and then washed in deionized water several times.

Subsequently, the Au absorbed wafer was soaked in a gold nanowire growth solution containing the ligand para-mercaptobenzoic acid (MBA), $HAuCl_4$, and L-ascorbic acid for 5 min. Finally, the wafer was rinsed with ethanol and dried in air.

Transfer of the gold nanowires to PDMS elastomeric substrate: Polydimethylsiloxane (PDMS) precursor was mixed with a curing agent in the proportion of 10:1 by weight. After stirring, the mixture was poured onto the gold nanowire bearing wafer described above. To ensure successful transfer of Au nanowires, the wafer coated with PDMS was put into a vacuum chamber to remove air bubbles. After heating at 60° C. for 4 h, the PDMS substrate was carefully peeled off.

Regrowth of Au NWs on PDMS substrate: The PDMS substrate was again soaked in Au nanowire growth solution for 5 min.

As depicted in FIG. 16A the wafer surface was covered with a dense layer of vertically standing gold nanowires of average length about 10 μm and width of about 5 nm. After transfer, the gold nanowires were almost embedded in PDMS, with the bottom fraction exposed as shown in FIG. 16B. After regrowth, the PDMS elastomeric substrate changed colour from golden to dark grey and its SEM image FIG. 16C indicated the gold nanowires had regrown regrew along the exposed surface.

Adhesion test: Adhesion is critical for successful long-term use of stretchable electronics and implanted devices. However, in certain applications these electronics and devices may be subjected to interface friction that may induce debonding and delamination. The conductors fabricated according to the above described method and having standing nanowires partially embedded in elastomer have good adhesion with concomitant resistance to debonding and delamination.

Figure 17A:
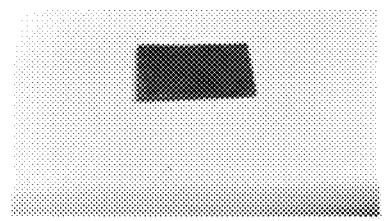
FIG. 17 illustrates the adhesion performance of nanowires produced by the methods depicted in FIG. 12 and FIG. 15: (A) depicts the gold nanowires grown directly on elastomeric substrate as per FIG. 12; (B) depicts the gold nanowires grown on a silicon wafer and embedded in elastomeric substrate as per FIG. 15; and (C) depicts the gold nanowires further grown (regrown) on the elastomeric substrate as per FIG. 15. Corresponding illustrations D, E and F illustrate the performance of the conductor after Scotch® brand adhesive tape has been applied and removed from the nanowire covered surface of conductors A, B and C.
Figure 17B:
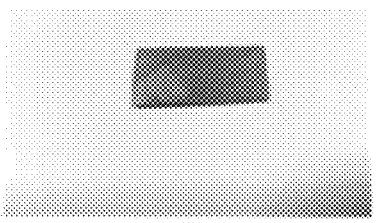
Figure 17C:
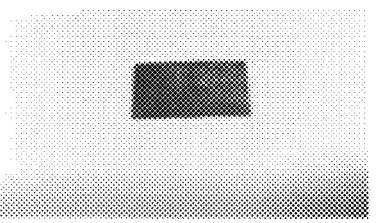
Figure 17D:
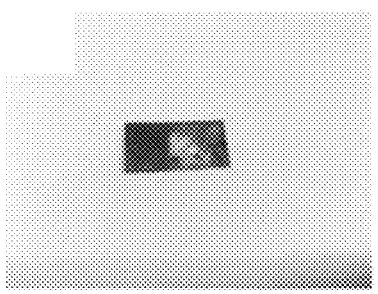
Figure 17E:
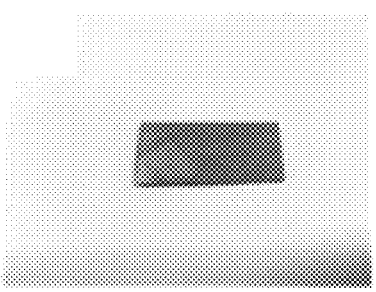
Figure 17F:
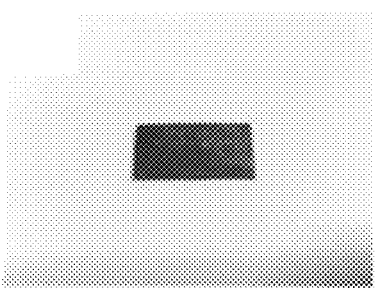
Figure 18A:
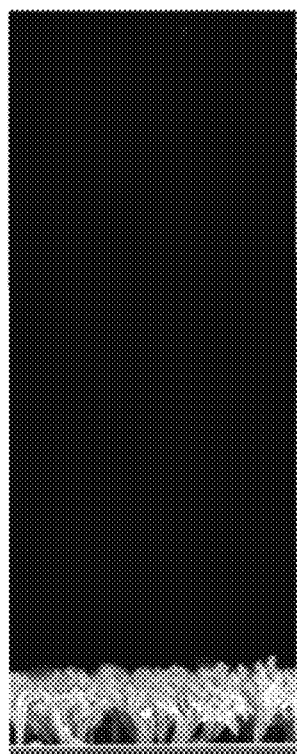
FIG. 18 illustrates cross sectional vies of SEM images of films according to the present invention with different thicknesses (FIG. 18A) ~1.5 μm, (FIG. 18B) ~3.5 μm, (FIG. 18C) ~7 μm and (FIG. 18D) ~14 μm.
Figure 18B:
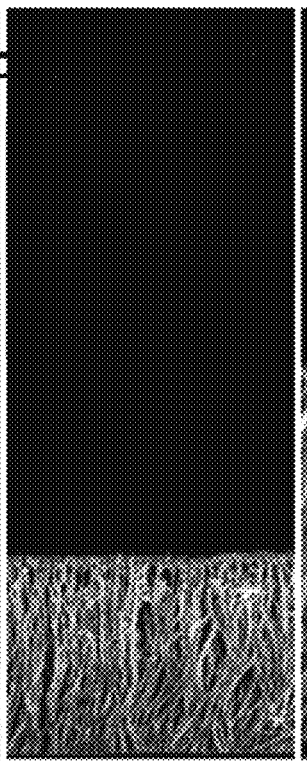
Figure 18C:
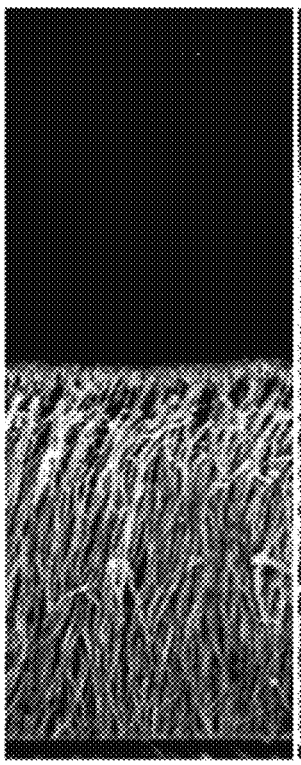
Figure 18D:
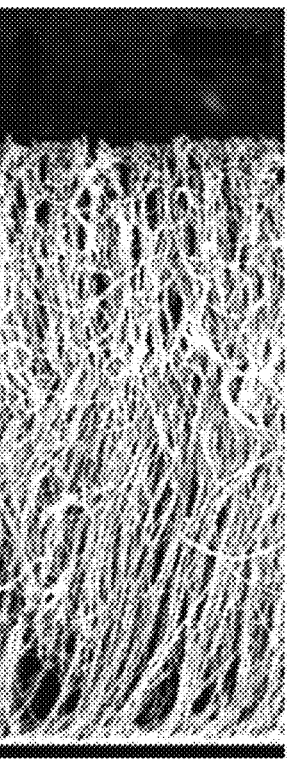
Figures 19A, 19B:
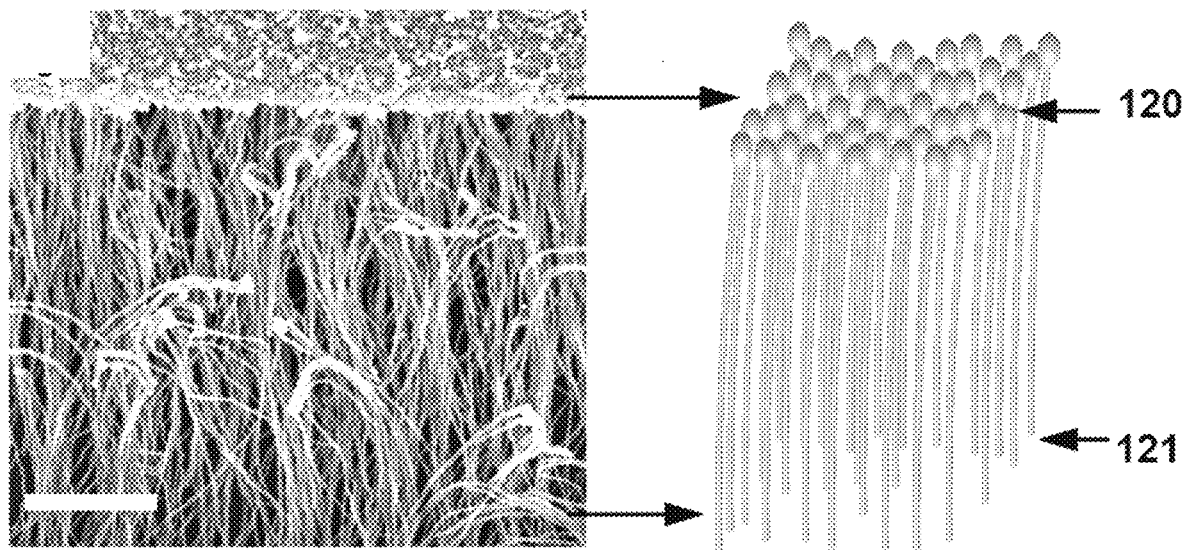
FIG. 19 illustrates a cross sectional SEM image (FIG. 19A) showing the morphologies of gold nanowires alongside a schematic (FIG. 19B) of the structure of standing gold nanowires indicating the "head" end and "tail" end.
Figures 20A, 20B:
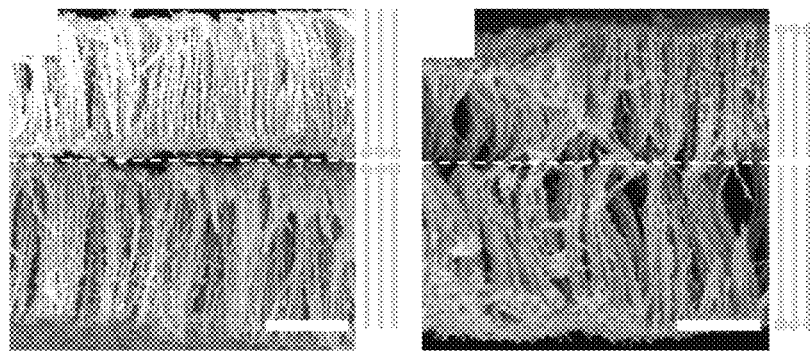
Figures 20C, 20D:
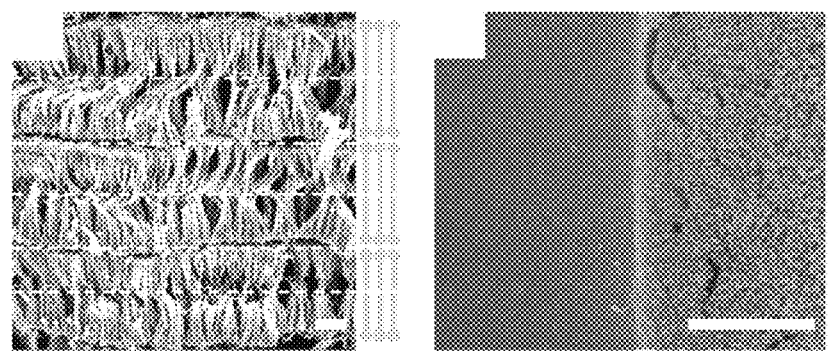
FIG. 20D is a top view SEM illustrating a mask-assisted staircase-like arrangement of nanowire growth. (Scale bar: 5 μm)
Figure 21A:
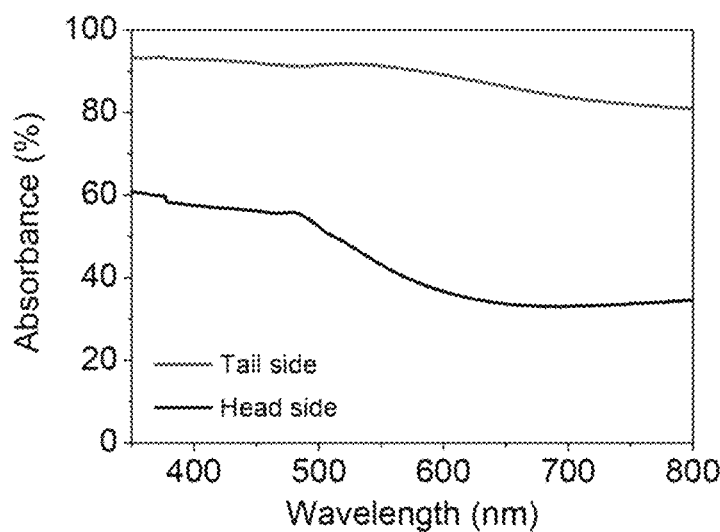
FIG. 21 illustrates distinct optical properties of films according to the present invention between the first surface and the second surface. The film was obtained after 5 mins growth time (FIG. 21A) and shows different contact angles from the first (head) surface to the second (tail) surface (FIG. 21B), and sheet resistance as a function of nanowire height (FIG. 21C) (□.—measurement on the tail surface; ■—measurement on the head surface).
Figure 21B:
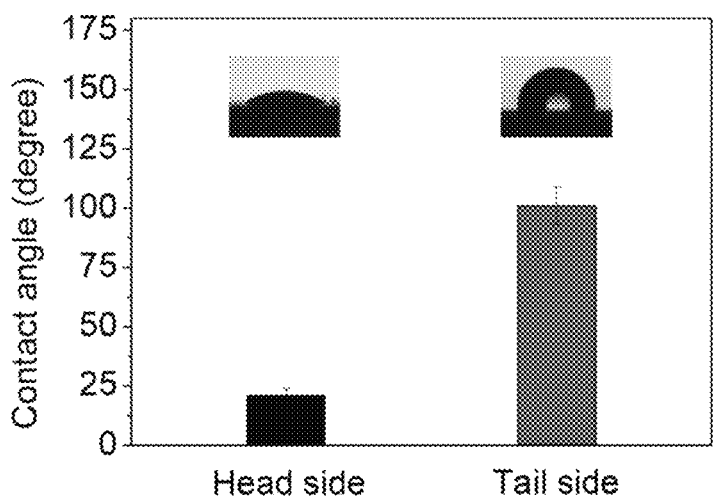
Figure 21C:
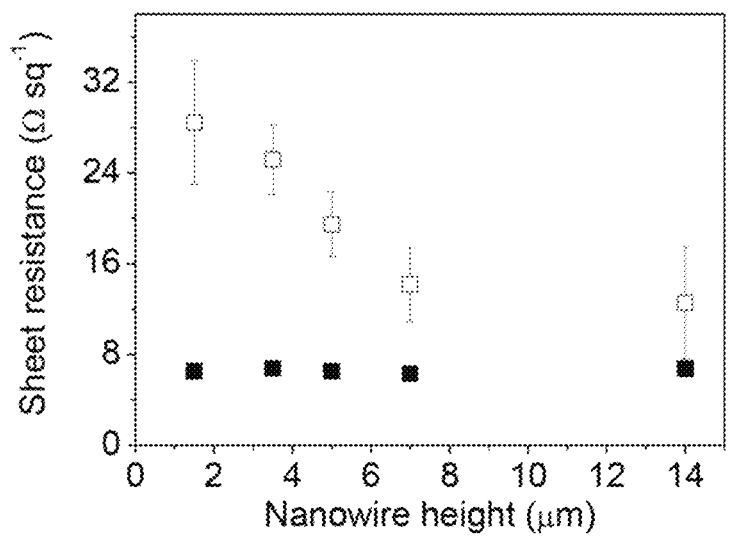
Figure 22B:
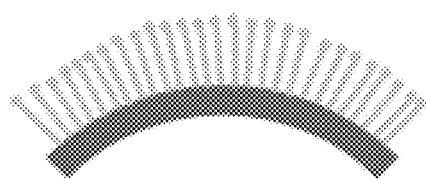
FIG. 22 illustrates mechano-electrical properties of elastic conductors according to the present invention comprising gold nanowires about 1.5 μm long on PET sheet substrate.
FIG. 22A is a graph of bending radius (mm) for the elastic conductors tail bonded (FIG. 22B) and head bonded (FIG. 22D) under tensile strain and tail bonded (FIG. 22C) and head bonded (FIG. 22E) under compressive strain.
Figure 22C:
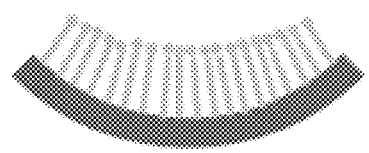
Figure 22D:
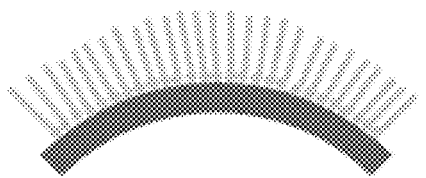
Figure 22E:
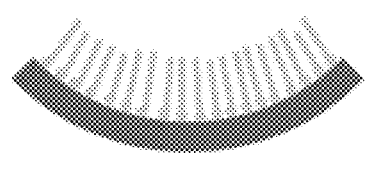
Figure 22A:
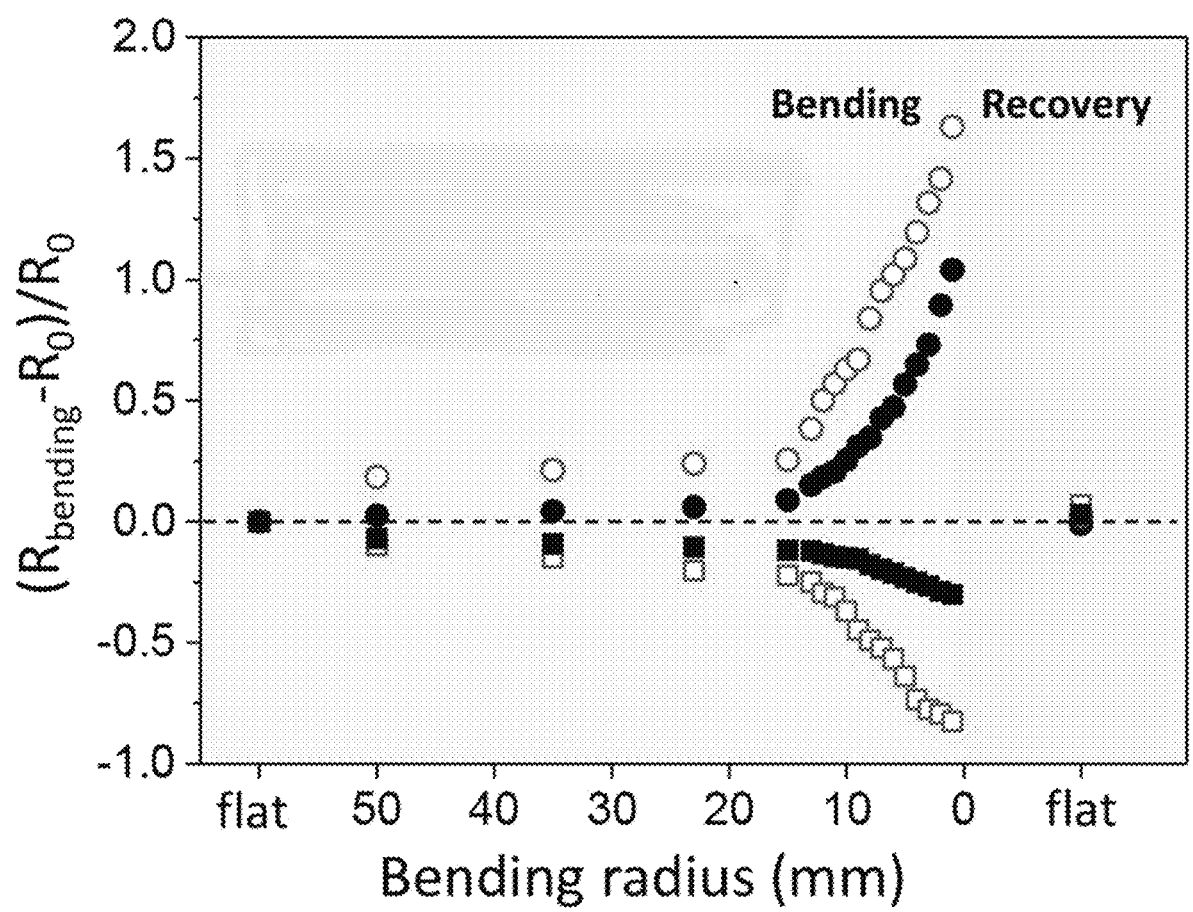
Figure 23A:
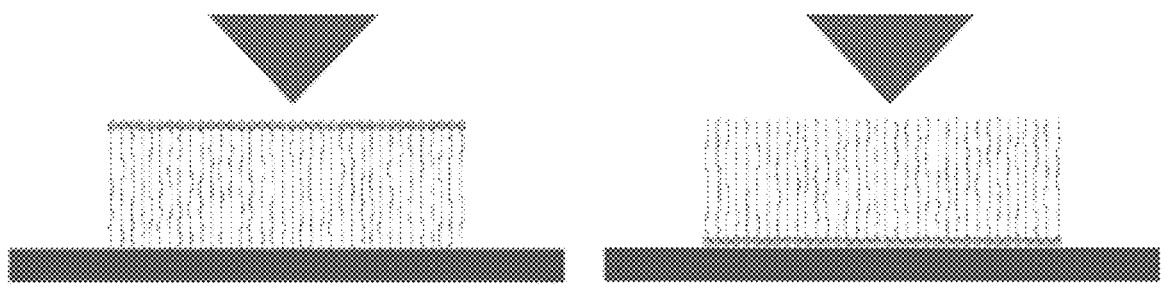
FIG. 23 illustrates plots comparing electrical responses of four kinds of gold nanowires deposited onto 1 mm thick PDMS sheet.
FIG. 23B illustrates electrical forces for elastic conductors according to the present invention—tail bonded (141) and head bonded (140) gold nanowires, buck gold (142) and lying down gold nanowires (143)—subjected to repeated point loads of 0.056N in the direction of the arrows (FIG. 23A).
Figure 23B:
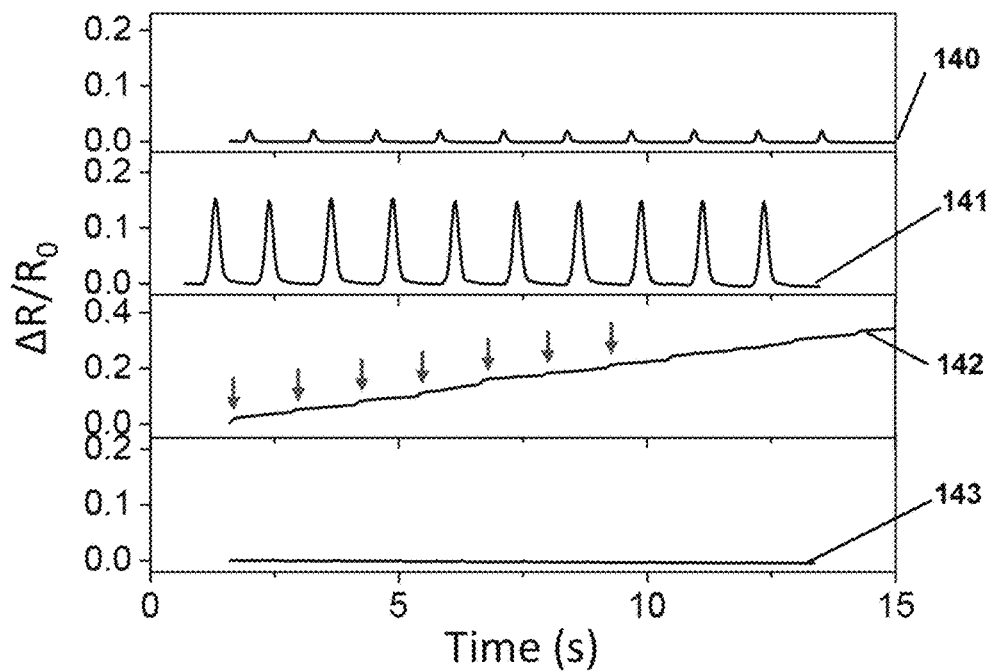
Figure 24A:
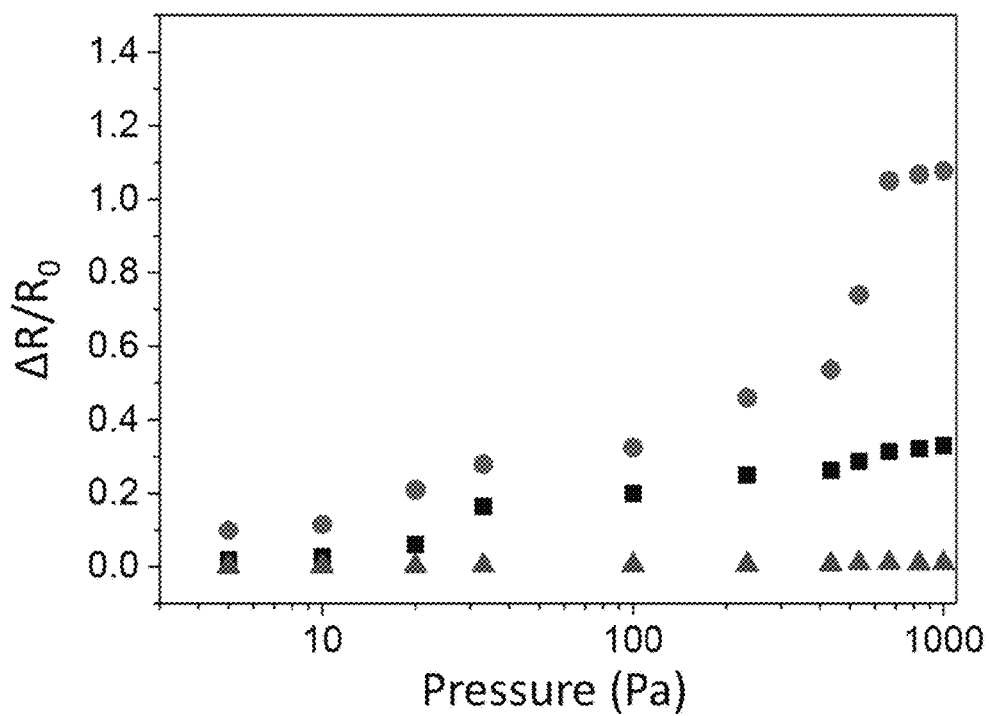
FIG. 24 illustrates three pressure sensors based on three types of bilayer nanowire assembly strategies. The elastic conductor film size is 3×3 mm$^2$. The films are assembled into head-to-head (■), head-to-tail (●), and tail- to-tail (▲) layouts. PDMS films with thickness of 1 mm were used as substrates.
Figure 24B:
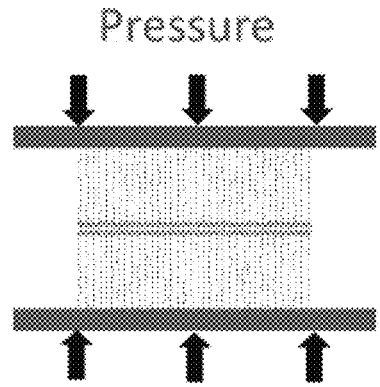
Figure 24C:
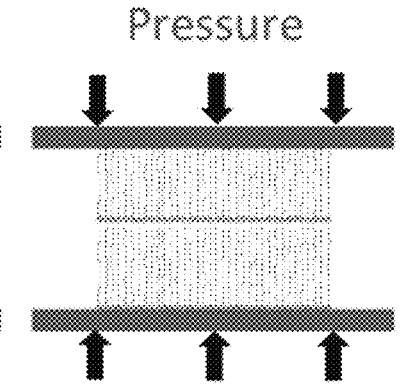
Figure 24D:
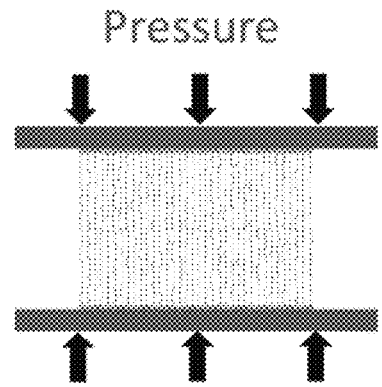

In order to test the adhesion, Scotch® brand adhesive tape test was applied to gold nanowires grown directly on elastomeric substrate (FIG. 17A); gold nanowires grown on a silicon wafer and embedded in elastomeric substrate (FIG. 17B); and nanowires embedded in elastomeric substrate and regrown (FIG. 17C). The adhesive tape was peeled off and results are depicted in FIGS. 17D, E and F. In the process of testing, it was observed that the gold nanowires on PDMS were readily detached by the adhesive tape. By contrast, no loss of nanowires was observed when the adhesive tape was peeled off the sample having partially embedded nanowires.

The strong adhesion may be enhanced, for example, by the use of bifunctional molecular glue such as (3-Aminopropyl) trimethoxysilane (APTMS). The amine moiety of APTMS strongly interacts with gold nanowires, and the silane moiety covalently bonds to the elastomeric surfaces.

Accordingly, the present invention provides for the development of a versatile strategy for construction of an unconventional, intrinsically elastic conductor in the form of a film by directly growing vertical aligned nanowires on elastomers. The elastic conductor of the present invention also demonstrates electromechanical tunability in response to changing nanowire height.

Unlike conventional continuous bulk metallic films or discontinuous percolation systems, the elastic conductors of the present invention when formed as films exhibit distinct optical, wetting, electrical, and mechanical properties which differ on each surface.

Optical Properties

One of the most striking features of gold elastic conductors according to the present invention is the fact that the film reflects light in a way akin to bulk metal on the surface formed by the "head" region of the nanowires, whilst it displays high (near-complete) absorption of light in the region adjacent the "tails" of the nanowires. The simplest way to conceptualise the observed near-perfect absorption of the surface adjacent the nanowire tails, is to use Fresnel's law of reflection (Introduction to Electrodynamics, D. J. Griffiths, Prentic Hall (1999)), which states that e reflectance R for a normally incident beam of light from a medium characterised with a refractive index $n_{inc}$ (for air $n_{inc} \approx 1$), onto a surface of refractive index $n_s$ is given by:

$$R = \left(\frac{n_s - n_{inc}}{n_s + n_{inc}}\right)^2 \qquad \text{Equation (1)}$$

which clearly approaches R=0 (i.e. perfect absorption, since A=100% -R) as the refractive index of the surface matches that of the incident medium (or $n_s \rightarrow n_{inc}$ in the equation).

In the elastic conductors of the present invention this refractive index matching originates due to the spatial sparseness of the nanowires adjacent the absorbing (tail) region. For example when each nanowire has a diameter of 7.8±1.7 nm and the region has a number density of ~1.09× $10^4$ μm$^{-2}$, the average refractive index is close to that of the material in the void between them (i.e. air). Furthermore, the region can be flat and uniform, despite its sparseness, thus leading to an effective homogeneous region with respect to its interaction with light (which thus affirms the adequacy of using Fresnel's law of reflection). A similar argument has been developed for example, to explain the high optical absorbance measured for disordered arrays of carbon nanotubes.

In order to gain further insight, elastic conductor material of the present invention was modelled as a one-dimensional, periodic array of vertically oriented wires using a Fourier-Modal Method (Thongrattanasiri et al, Phys. Rev. let. 108, 047401 (2012)). This geometry provides insight to the effect of the cross-sectional geometry of the structure on the measured optical properties, but it clearly does not represent the complex three-dimensional and disordered nature of the nanowire arrays. For example, the calculated absorption spectrum for a nanowire array with a period≈1.6 times the nanowire width. The light was normally incident light with its electric field polarised on the plane of incidence.

Consistent with the discussion above, the calculated absorbance was >80% for most of the wavelength range considered. The calculated spectrum showed strong oscillations for wavelengths >650 nm, which occurred as a consequence of the assumed periodicity of the modelled structure. In the elastic conductor of the present invention, there is no fixed period as the nanowires form disordered arrays and, consequently, these oscillations are absent in experimental data. However, the results of the model one-dimensional structure can be almost perfectly superimposed to the measured absorption spectrum, providing strong evidence that the high measured absorbance (or near-perfect absorption of light) occurs as a consequence of the refractive index matching discussed in relation to equation (1) above.

Wetting Properties

The elastic conductor material of the present invention typically has a hydrophilic surface (in the second region associated with the nanowire heads) and a hydrophobic surface (in the first region associated with the nanowire tails).

Water contact angle of film surface adjacent the nanowire tails:

The region of the elastic conductor material of the present invention adjacent the tails of the nanowires contains standing nanowires and air, which is in essence heterogeous. The apparent contact angle θ* can be predicted by the known Cassie-Baxter equation (Abdelsalam et al, Langmuir 5, 1753-1757 (2005));

$$\cos\Theta^* = -1 + \phi(\cos\Theta + 1) \qquad \text{Equation (2)}$$

where φ is the solid surface fraction and e is the equilibrium contact angle obtained on a smooth surface of the same chemical composition. The solid fraction φ can be estimated from the nanowire diameter and its number density:

$$\phi = n\pi r^2 \qquad \text{Equation (3)}$$

where r is the nanowire radius and n the nanowire number density, which have been estimated to be 3.9 nm and 1.09×$10^4$ μm$^2$, respectively. Thus yields a solid fraction φ of 0.52 from Equation (3). By contrast, the contact angle of a flat gold surface is 70°. Those values, can be used to solve equation (2), yielding an apparent contact angle of 107.5°. This is in good agreement with the experimental value of 101±8°.

Water Contact Angle of Film Surface at the Nanowire Heads:

The head side of the elastic conductor of the present invention, such as a gold nanowire based conductor in the form of a film is composed of closely-packed nanoparticles which behave like a bulk gold film. However, the experimentally estimated contact is ~21°, which is much lower than that for a smooth gold surface (70°). This indicates MBA molecules must form a self-assembled monolayer on gold nanoparticle surfaces via robust Au—S covalent bonds. This enables exposure of MBA carboxyl moieties to water, hence, rendering the head-sided films highly hydrophilic.

Thus, in this example the elastic conductor material of the present invention in the form of a film comprised of gold nanowires, typically exhibits a hydrophilic surface with a contact angle of 21±3 degrees, compared with a hydrophobic surface with a contact angle of 101±8 degrees. The low wettability of the hydrophilic surface is due to air pockets trapped within the nanowire matrix, and the experimentally measured angle can be well-predicted by the Cassie-Baxter model. The high wettability of the hydrophilic surface is attributed to chemical modification of gold nanoparticle surfaces by 4-mercaptobenzoic acid (MBA) molecules rendering surface rich in carboxyl groups. Thus, the head side exhibits an even smaller contact angle than bulk gold surfaces.

Conductivity

In addition, the measured resistance of an elastic conductor of the present invention in the form of a film from the nanowire head surface is about ~6.6 Ωsq-1, which is independent of nanowire height. However, the resistance measured from the surface adjacent the nanowire tails decreases with nanowire height but remains greater than the other surface. This result is due to the closely-packed nanoparticle layer of the first surface that promotes efficient electron-hopping; in contract, well-spaced nanowires inhibit efficient electron transfer from wire to wire.

Each individual nanowire was assumed as 1D zero-gap nanocube arrays without junction resistance. This allowed the application of an extension of a simple Volger model. (Volger J., Phys. Rev 79, 1023 (1950) to fit experimentally measured resistance which leads to a value of 15,000 for the dimensionless fitting parameter b. This large value indicates combined tunnelling and ohmic contacts between nanowires.

Specifically, in this application of the Volger model, nanowires are assumed to be consisted of stacking nanocubes depending with the edge size a. The height of nanowires is determined by the number of cubes with equal spacing between the neighbouring nanowires. It is further assumed that the inter-cube spacing along z direction is $s_z=0$, while along x and y directions are $s_x$ and $s_y$, respectively. The choice of cubical nature of nanowires makes it possible to take the same nanocube resistance '$R_{nc}$' and the three axes. To simplify the calculation, the resistivity of the nanocubes $\rho_{nc}$ is considered to be the same as that of a single crystal, and hence could be written as:

$$R_{nc} = \rho_{nc}/a \qquad \text{Equation (4)}$$

Considering the film of length l, width w and thickness h, the number of nanocubes along the length, width and thickness direction could be defined as $n_l$, $n_w$ and $n_h$, respectively. So, the total number of nanocubes in the film is equal to:

$$n = n_l n_w n_n \quad \text{Equation (5)}$$

Also, from the assumed arrangement of nanocubes:

$$h = n_n a$$

$$l = n_l a + (n_l - 1) s_x$$

$$w = n_w a + (n_w - 1) s_y \quad \text{Equation (6)}$$

The resistance along the length of the film can be measured by taking the contacts across the cross-section in the yz plane.

The whole film can be considered to be a parallel combination of '$n_w n_h$' resistive elements, where resistance of each element is given by $$R = n_l R_{nc} + (n_l - 1) R_v \quad \text{Equation (7)}$$

Thus, the net resistance along the length of the film between the two contacts would be given as:

$$R_{net} = \frac{n_l R_{nc} + (n_l - 1) R_v}{n_w n_h} \quad \text{Equation (8)}$$

Substituting equation (6) gives:

$$R_{net} = \frac{\left(\frac{l+s_x}{a+s_x}\right)\frac{\rho_{nc}}{a} + \left(\frac{l-a}{a+s_x}\right) R_v}{\frac{h}{a}\left(\frac{w+s_y}{a+s_y}\right)} \quad \text{Equation (9)}$$

It is assumed that $s_x = s_y = s$. In general, the inter-cubic resistance $R_v$ is quite higher than the cube resistance $R_{nc}$. $R_v$ may be written as $\rho_{nc} s \beta / a^2$. $\beta$ is a dimensionless quantity depending on the mechanism of charge transfer between the two neighbouring cubes, such as ohmic conduction, tunneling or thermonic emission. It may also be a combination of these, depending on the actual boundary structure, then eq (9) maybe written as $$R_{net} = \frac{\rho_{nc}}{h(w+s)}\left[l + s + (l-a)\beta\frac{s}{a}\right] \quad \text{Equation (10)}$$

In our case it is quite reasonable to apply the condition l>>a, l>>s and w>>s above.

Then, equation (10) reduces to $$R_{net} = \frac{l\rho_{nc}}{hw}\left(1 + \beta\frac{s}{a}\right) \quad \text{Equation (11)}$$

Based on experiments it is estimated that a =7.8 nm and s=1.5 nm, using measurement of the resistance of the second surface of the film with l=w=10 mm and $\rho_{nc} = \rho_{Au} = 2.6 \times 10^{-8}$ m Ω (T=20° C.). The experimental result fitted well to theoretical calculations when $\beta = 15,000$.

Mechatronic responses generally

Furthermore, elastic conductors of the present invention exhibit entirely different mechatronic responses depending whether the nanowires are head-bonded or tail-bond to the elastic substrate. When nanowires were directly grown on Ecoflex substrates with the tail end chemically bound to the substrate surface the films exhibit exceptionally high stretchability up to 800% of strain without losing conductivity. The original conductivity can be recovered upon stress release. In contrast, if the film is simply transferred onto Ecoflex with the head end of the nanowires in contact with the elastomer, the conductivity is lost permanently with only 83% strain applied. Visual film delamination and cracks are evident for head side of the film but not for tail-bonded one.

A further plot of normalised resistance ($R/R_0$) vs normalised length square $(L/L_0)^2$ for experimental data collected and theoretical predictions based on copper-bonded Kapton film showed 800% stretchability for tailed-bonded film according to the present invention. This clearly outperforms state-of-the-art inorganic stretchable conducting Kapton film. Remarkably, the elastic conductor of the present invention retains >93% of the initial conductance after stretching/releasing to 800% strain for 2,000 cycles. This has not yet been achieved, to the best of our knowledge, by previously-reported prior art stretchable conductors without using pre-strain or buckling designs.

Control experiments showed that evaporated gold can only survive ~10% strain before conductivity is lost and percolation nanowire film can only tolerate a ~150% strain. Both bulk metal and percolation nanowire films show no conductivity recovery upon stress release.

Stretchability

Without being bound by theory it is believed that strong adhesion between nanowires and substrate and 'accordion-fan-like' V-shaped cracking process are responsible for exceptional high stretchability of elastic conductors according to the present invention.

Finite element analysis (FEA) modelling was carried out for the stretching process of an elastic conductor of the present invention in the form of a film. It was assumed that each nanowire deforms elastically without breaking up and the tail end remains firmly attached to the elastomeric substrate. The results showed that cracks initiate from the region of the nanowire heads, which serve as unzipping points for strongly bundled nanowire arrays. Yet the interacting nanowire tail ends deform conformally to the substrate without cracking. This leads to the formation of V-shaped cracks, which can recover fully to its initial state upon strain release. Atomic force microscopy (AFM) characterization clearly shows the presence of the V-shaped cracks. The cracking depths measured for two elastic conductor films under different strains were significantly lower than the film thickness, validating FEA modelling results. In contrast, both bulk gold films and percolation nanowire films experienced conventional U-shaped cracks.

Concurrent film delamination prevents recovery of original structures, thus leading to poor conductivity recovery. Note that this unique stretching mechanism of the elastic conductor of the present invention is fundamentally different from previous aligned carbon nanotube arrays where building blocks were not standing normal to substrate surface but lying down flush on the surface of the substrate.

Bending Sensitivity

Elastic conductors according to the present invention may also exhibit bimodal responses to compressive and tensile bending forces. Tensile and compressive bending sensitivities of 0.98 rad$^{-1}$ and -0.54 rad$^{-1}$, respectively have been measured for elastic conductors having the tail end of nanowires attached to the elastomeric substrate. By contrast, elastic conductors having the head end of nanowires attached to the elastomeric substrate exhibit corresponding values reduced to 0.66 rad$^{-1}$ and -0.34 rad$^{-1}$, respectively.

Without wishing to be bound by theory it is believed that the reason for high tensile and compressive sensitivities for tail-bonded film is due to relatively large deformation of the head ends which exhibit behaviour akin to a bulk metal phase and is electrically more conductive. Note that traditional bulk metallic film or discontinuous percolation nanowire film only show a single modal response to compressive and tensile strains.

The bending sensitivity may be defined as $$S = \theta(R_{bending} - R_0)/R_0 \quad \text{Equation (12)}$$

where $R_0$ is the original resistance of film before bending, $R_{bending}$ is the resistance of film with bending and $\theta$ is applied bending degree.

Discrimination of External Point Loads

The manner in which the elastic conductors of the present invention respond electrically to point load is also fundamentally different from conventional films. \ For example, elastic conductors of the present invention exhibiting a sensitivity of point load to the first surface of ~2.71 N$^{-1}$; yet under the same condition, the point load sensitivity to the second surface is ~0.73 N$^{-1}$.

Importantly, the electrical responses are reversible and conductivities recover fully upon load release for both sides of the elastic conductor in the form of a film. In contrast, neither bulk gold film nor nanowire percolation films show any discrimination for point load sensitivity, and no conductivity recovery was observed for bulk film upon load release. This result is attributed to elastic nature of the present invention, yet rigid gold films will experience irreversible crack/delamination under point load. The high sensitivity of the first surface may be due to its relatively more rigid nature, compared with the underlying nanowire, which has a greater tendency to crack under point load, thus leading to higher sensitivity.

The point load sensitivity may be defined as:

$$S = F(R_{load} - R_0)/R_0 \quad \text{Equation (13)}$$

where F is the point load and $R_{load}$ is the resistance of film under a point load.

Elastic Conductor Design Control

The present invention presents opportunities for controlled design of versatile pressure sensors by altering the number of layers and assembly strategies. As a proof of concept, three elastic conductors according to the present invention were fabricated with nanowires arranged (i) head-to-head, (ii) head-to-tail and (iii) tail-to-tail. The sensitivities of the three layouts were compared in the elastic deformation range of 0-1,000 Pa. The measured sensitivity sequence is head-to-tail>head-to-head>tail-to-tail. In the head-to-tail assembly the tendency for formation of cracks is greatest. In the head-to-head assembly, the tendency for both surfaces to crack is reduced due to enhanced strength. By contrast, in the tail-to-tail assembly no cracking results and thus the film conductivity does not respond to applied pressure.

For purposes of description herein, it is to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

While this invention has been described in connection with specific embodiments thereof, it will be understood that it is capable of further modification(s). This application is intended to cover any variations uses or adaptations of the invention following in general, the principles of the invention and including such departures from the present disclosure as come within known or customary practice within the art to which the invention pertains and as may be applied to the essential features hereinbefore set forth.

As the present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the appended claims. The described embodiments are to be considered in all respects as illustrative only and not restrictive.

Various modifications and equivalent arrangements are intended to be included within the spirit and scope of the invention and appended claims. Therefore, the specific embodiments are to be understood to be illustrative of the many ways in which the principles of the present invention may be practiced. In the following claims, means-plus-function clauses are intended to cover structures as performing the defined function and not only structural equivalents, but also equivalent structures.

"Comprises/comprising" and "includes/including" when used in this specification is taken to specify the presence of stated features, integers, steps or components but does not preclude the presence or addition of one or more other features, integers, steps, components or groups thereof. Thus, unless the context clearly requires otherwise, throughout the description and the claims, the words 'comprise', 'comprising', 'includes', 'including' and the like are to be construed in an inclusive sense as opposed to an exclusive or exhaustive sense; that is to say, in the sense of "including, but not limited to".

The invention claimed is:

1. An elastic conductor comprising:
   an elastomeric substrate comprising a surface, and
   an array of gold nanowires grown by using a growth solution containing 550 µM 4-Mercaptobenzoic acid, 6.8 mM of chloroauric acid, and 16.4 mM L-ascorbic acid,
   wherein the nanowires are upstanding relative to the surface of the elastomeric substrate.

2. The elastic conductor according to claim 1, wherein the gold nanowires are partially embedded in the elastomeric substrate.

3. The elastic conductor according to claim 1, having a conductivity retention of >93% after 2,000 cycles to 800% strain.

4. The elastic conductor according to claim 1, wherein the gold nanowires have a nanoparticle head and a nanowire tail.

5. The elastic conductor according to claim 1, wherein the gold nanowires in the array have a nanoparticle head and a nanowire tail and the array comprises two or more layers.

6. The elastic conductor according to claim 1, wherein the array has at least two regions that exhibit different physical or chemical properties.

7. The elastic conductor according to claim 1, wherein each gold nanowire of the array has a nanoparticle head and a nanowire tail,
   wherein the tails comprise a first region adjacent the elastomeric substrate and the heads comprise a second region, and wherein the first region and the second region exhibit different physical or chemical properties.

8. The elastic conductor according to claim 1, wherein the array has at least two regions that exhibit different properties chosen from the group comprising electricity conduction, light interaction and water interaction.

9. The elastic conductor according to claim 1, wherein the elastic conductor is used as a sensor.

10. The elastic conductor according to claim 1, wherein the elastic conductor is used as a soft electronic device.

11. A supercapacitor comprising the elastic conductor of claim 1.

12. A method of fabricating an elastic conductor comprising an elastomeric substrate and an array of gold nanowires upstanding relative to the surface of the elastomeric substrate, the method comprising the steps of:

functionalising a surface of the elastomeric substrate, seeding the functionalised surface with particulate gold, and growing the array of gold nanowires from the particulate gold, by using a growth solution containing 550 μM 4-Mercaptobenzoic acid, 6.8 mM of chloroauric acid, and 16.4 mM L-ascorbic acid wherein the gold nanowires are upstanding relative to the surface of the elastomeric substrate.

\* \* \* \* \*